(12) United States Patent
Hagiwara et al.

(10) Patent No.: US 10,746,077 B2
(45) Date of Patent: Aug. 18, 2020

(54) DIAGNOSTIC APPARATUS FOR EXHAUST GAS SENSOR

(71) Applicant: TOYOTA JIDOSHA KABUSHIKI KAISHA, Toyota-shi, Aichi-ken (JP)

(72) Inventors: Koji Hagiwara, Sunto-gun (JP); Yasushi Iwazaki, Ebina (JP); Toru Kidokoro, Hadano (JP); Hirotaka Saito, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 31 days.

(21) Appl. No.: 16/116,256

(22) Filed: Aug. 29, 2018

(65) Prior Publication Data

US 2019/0072020 A1 Mar. 7, 2019

(30) Foreign Application Priority Data

Sep. 7, 2017 (JP) .................................. 2017-172109

(51) Int. Cl.
*F01N 11/00* (2006.01)
*G07C 5/08* (2006.01)
*F01N 3/36* (2006.01)

(52) U.S. Cl.
CPC .............. *F01N 11/007* (2013.01); *F01N 3/36* (2013.01); *G07C 5/0808* (2013.01);
(Continued)

(58) Field of Classification Search
CPC ...... F01N 3/36; F01N 11/007; F01N 2550/00; F01N 2560/025; F01N 2610/03;
(Continued)

(56) References Cited

U.S. PATENT DOCUMENTS 5,537,321 A * 7/1996 Yoshizaki ............. F01N 3/2026
123/179.21
5,758,491 A * 6/1998 Agustin ................ F01N 11/007
60/274
(Continued)

FOREIGN PATENT DOCUMENTS

EP 1 333 171 8/2003
JP 2003-214245 7/2003
(Continued)

*Primary Examiner* — Atul Trivedi
(74) *Attorney, Agent, or Firm* — Finnegan, Henderson, Farabow, Garrett & Dunner, LLP

(57) ABSTRACT

An exhaust gas sensor is diagnosed with high accuracy as much as possible while maintaining the function of an exhaust system of an internal combustion engine. In a diagnostic apparatus for an exhaust gas sensor which is applied to an internal combustion engine including an exhaust gas sensor, a fuel supplier, a controller configured to carry out predetermined fuel supply processing and predetermined oxygen concentration processing, and which diagnoses the exhaust gas sensor based on an output value thereof, provision is made for the controller that sets as a diagnostic output value a first output value, which is an output value at the side of the highest oxygen concentration in the output value of the exhaust gas sensor in a measurement period, and performs the diagnosis of the exhaust gas sensor based on the diagnostic output value, when predetermined fuel supply processing is carried out in the measurement period.

20 Claims, 14 Drawing Sheets

(52) U.S. Cl.
CPC .... *F01N 2550/00* (2013.01); *F01N 2560/025* (2013.01); *F01N 2610/03* (2013.01); *F01N 2900/0416* (2013.01); *F01N 2900/0422* (2013.01); *F01N 2900/1402* (2013.01)

(58) Field of Classification Search
CPC ..... F01N 2900/0416; F01N 2900/0422; F01N 2900/1402
USPC ........................................................ 701/29.7
See application file for complete search history.

(56) References Cited

U.S. PATENT DOCUMENTS

| | | | | |
|---|---|---|---|---|
| 6,295,862 | B1* | 10/2001 | Kurokawa | G01N 27/417 73/31.05 |
| 6,547,955 | B1* | 4/2003 | Hada | G01N 27/4067 204/406 |
| 7,953,530 | B1* | 5/2011 | Pederson | G07C 5/0808 701/31.7 |
| 2002/0011068 | A1* | 1/2002 | Kako | F01N 11/007 60/285 |
| 2002/0017467 | A1* | 2/2002 | Ando | F02D 41/146 205/781 |
| 2003/0089164 | A1* | 5/2003 | Bonadies | F02D 41/1441 73/114.39 |
| 2004/0244363 | A1* | 12/2004 | Makki | F01N 11/007 60/285 |
| 2005/0119822 | A1* | 6/2005 | Surnilla | F01N 11/002 701/114 |
| 2007/0084195 | A1* | 4/2007 | Surnilla | F01N 3/0807 60/285 |
| 2007/0084196 | A1* | 4/2007 | Surnilla | F01N 3/106 60/285 |
| 2007/0220862 | A1* | 9/2007 | Suehiro | F01N 3/101 60/277 |
| 2008/0154476 | A1* | 6/2008 | Takubo | F01N 11/007 701/101 |
| 2009/0107113 | A1* | 4/2009 | Thanasiu | F01N 11/007 60/276 |
| 2009/0211235 | A1* | 8/2009 | Sato | F01N 9/002 60/286 |
| 2009/0313970 | A1* | 12/2009 | Iida | F01N 3/0814 60/276 |
| 2010/0211293 | A1* | 8/2010 | Yamada | F01N 3/0253 701/108 |
| 2010/0307135 | A1* | 12/2010 | Miyamoto | F01N 11/00 60/277 |
| 2013/0179051 | A1* | 7/2013 | Tomimatsu | F02D 17/02 701/104 |
| 2013/0219862 | A1* | 8/2013 | Garimella | F01N 11/007 60/274 |
| 2013/0228008 | A1* | 9/2013 | Tsunekawa | G01M 15/10 73/114.75 |
| 2014/0208716 | A1* | 7/2014 | Mccoy | F02D 41/1439 60/274 |
| 2014/0216013 | A1* | 8/2014 | Osaki | F01N 3/106 60/285 |
| 2015/0039256 | A1* | 2/2015 | Michalske | F02D 41/1454 702/104 |
| 2015/0046063 | A1* | 2/2015 | Jammoussi | F02D 41/1495 701/103 |
| 2015/0275738 | A1* | 10/2015 | Van Nieuwstadt | B01D 46/0086 73/114.76 |
| 2016/0061131 | A1* | 3/2016 | Santillo | F01N 11/007 60/285 |
| 2016/0069242 | A1 | 3/2016 | Miyamoto et al. | |
| 2016/0109330 | A1* | 4/2016 | Chen | F02D 35/024 73/114.05 |
| 2016/0115879 | A1* | 4/2016 | Lehmen | F02D 41/1444 701/104 |
| 2016/0177847 | A1* | 6/2016 | Surnilla | F02M 26/21 701/108 |
| 2016/0363075 | A1* | 12/2016 | Larocca | F02D 41/1456 |
| 2017/0002709 | A1* | 1/2017 | Mikami | F01N 3/208 |
| 2017/0030244 | A1* | 2/2017 | Hagiwara | F02D 41/0275 |
| 2017/0089280 | A1* | 3/2017 | Santillo | F01N 3/08 |
| 2017/0248061 | A1* | 8/2017 | Martin | F02D 41/1447 |
| 2018/0179979 | A1* | 6/2018 | Miyamoto | F02D 41/222 |
| 2018/0209873 | A1* | 7/2018 | Monna | F01N 3/103 |
| 2019/0072020 | A1* | 3/2019 | Hagiwara | G07C 5/0808 |
| 2019/0128166 | A1* | 5/2019 | Nakagaki | F01N 3/208 |
| 2019/0128833 | A1* | 5/2019 | Nakagaki | G01N 33/0037 |
| 2019/0195107 | A1* | 6/2019 | Shirasawa | B01D 53/9431 |

FOREIGN PATENT DOCUMENTS

| | | |
|---|---|---|
| JP | 2011-117462 | 6/2011 |
| JP | 2016-056731 | 4/2016 |

* cited by examiner

[FIG. 1]
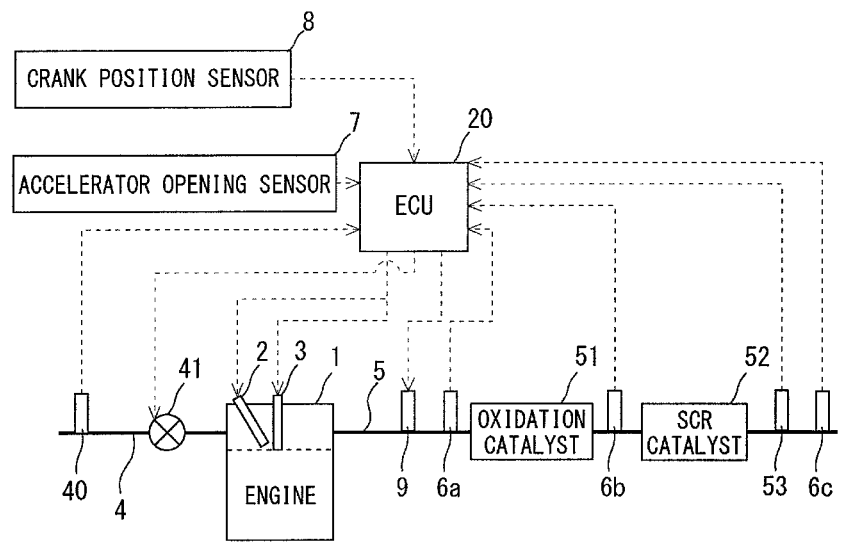
[FIG. 2]
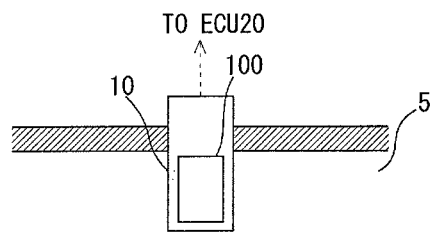

[FIG. 3]
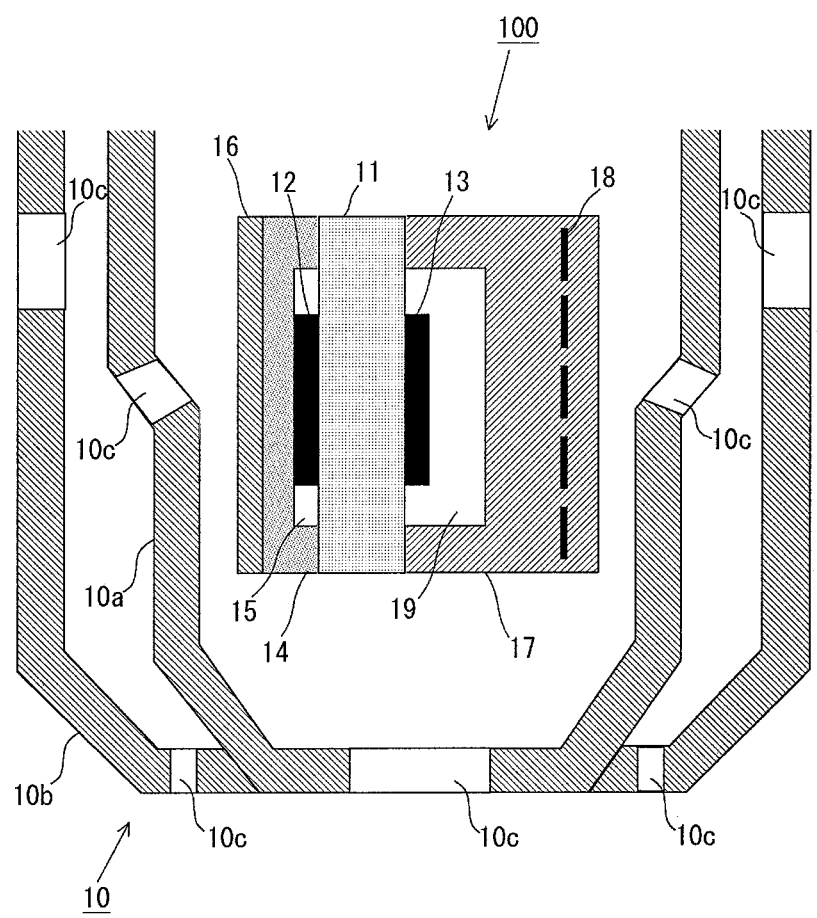

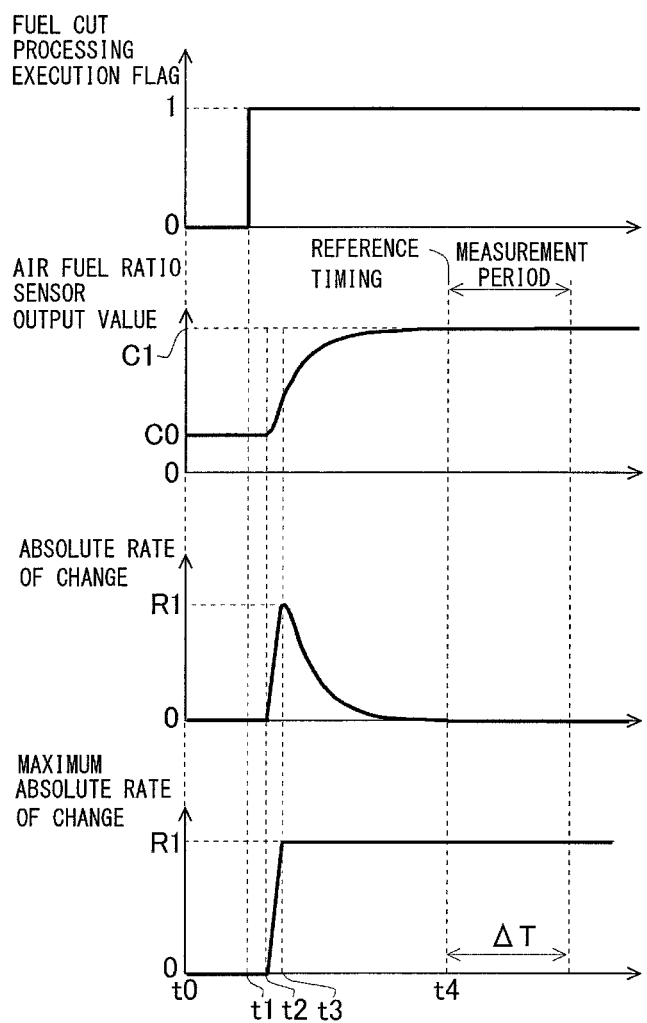

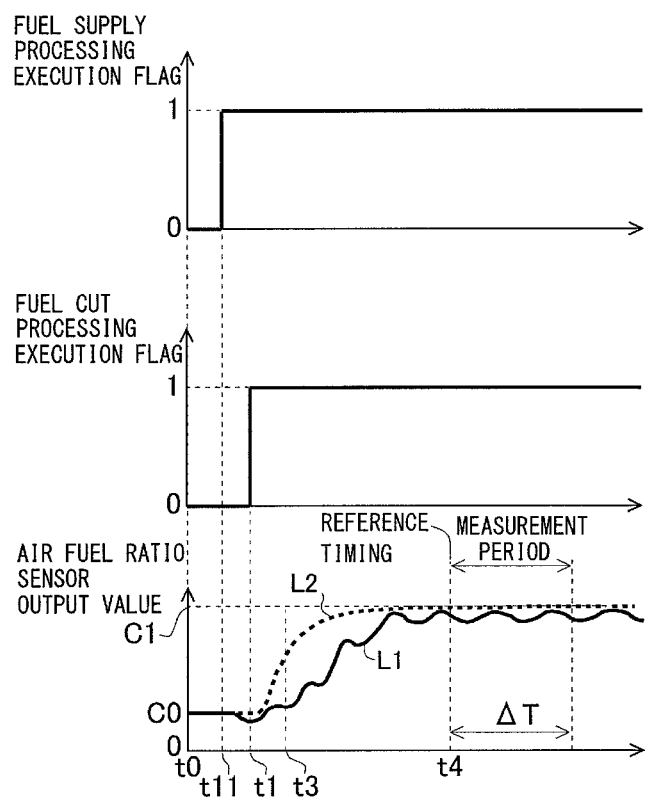
[FIG. 5]

[FIG. 6A]
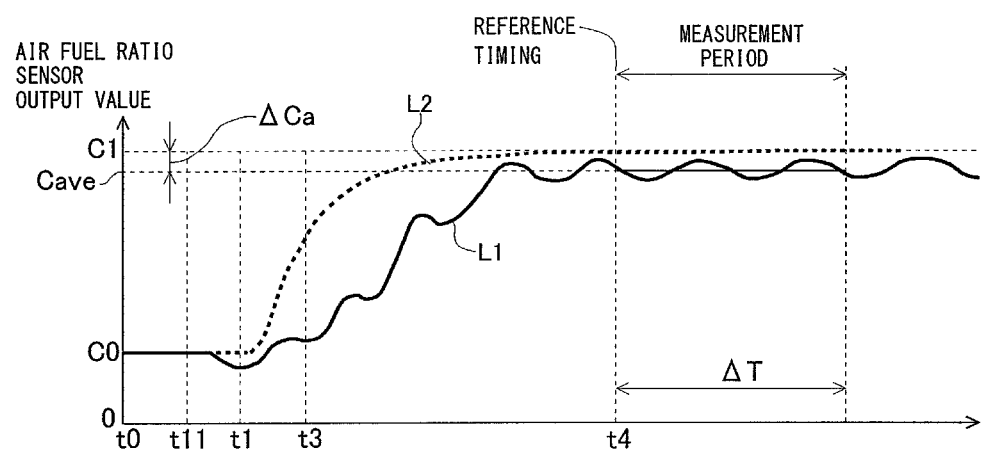

[FIG. 6B]
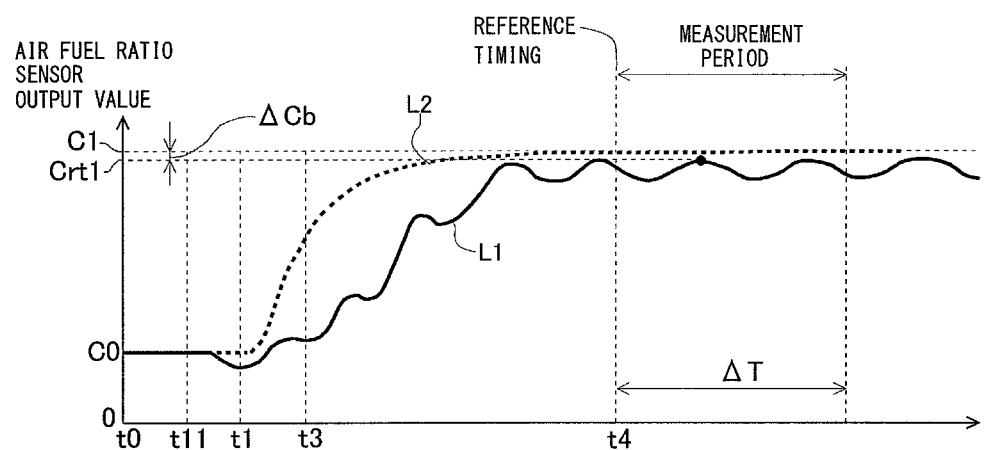

[FIG. 7]
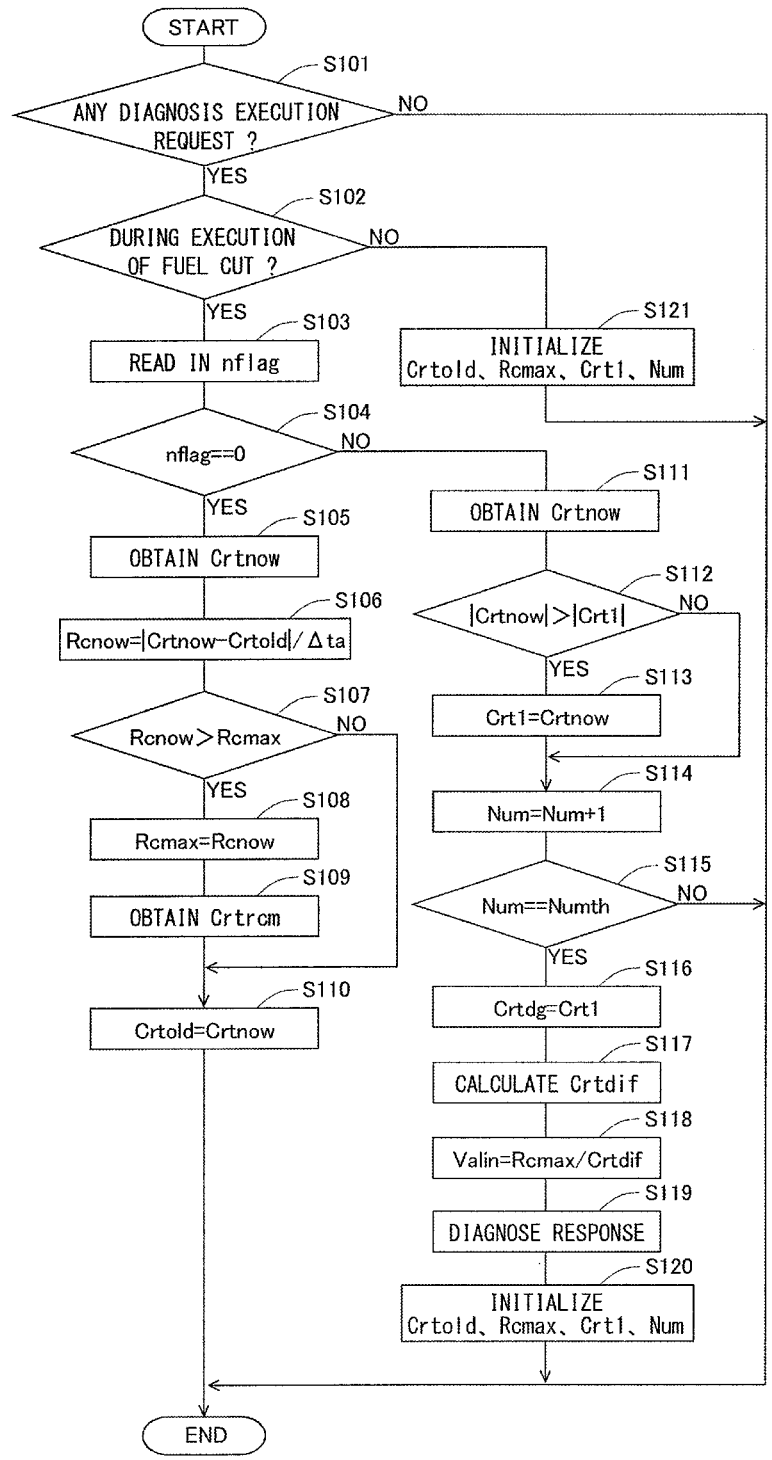

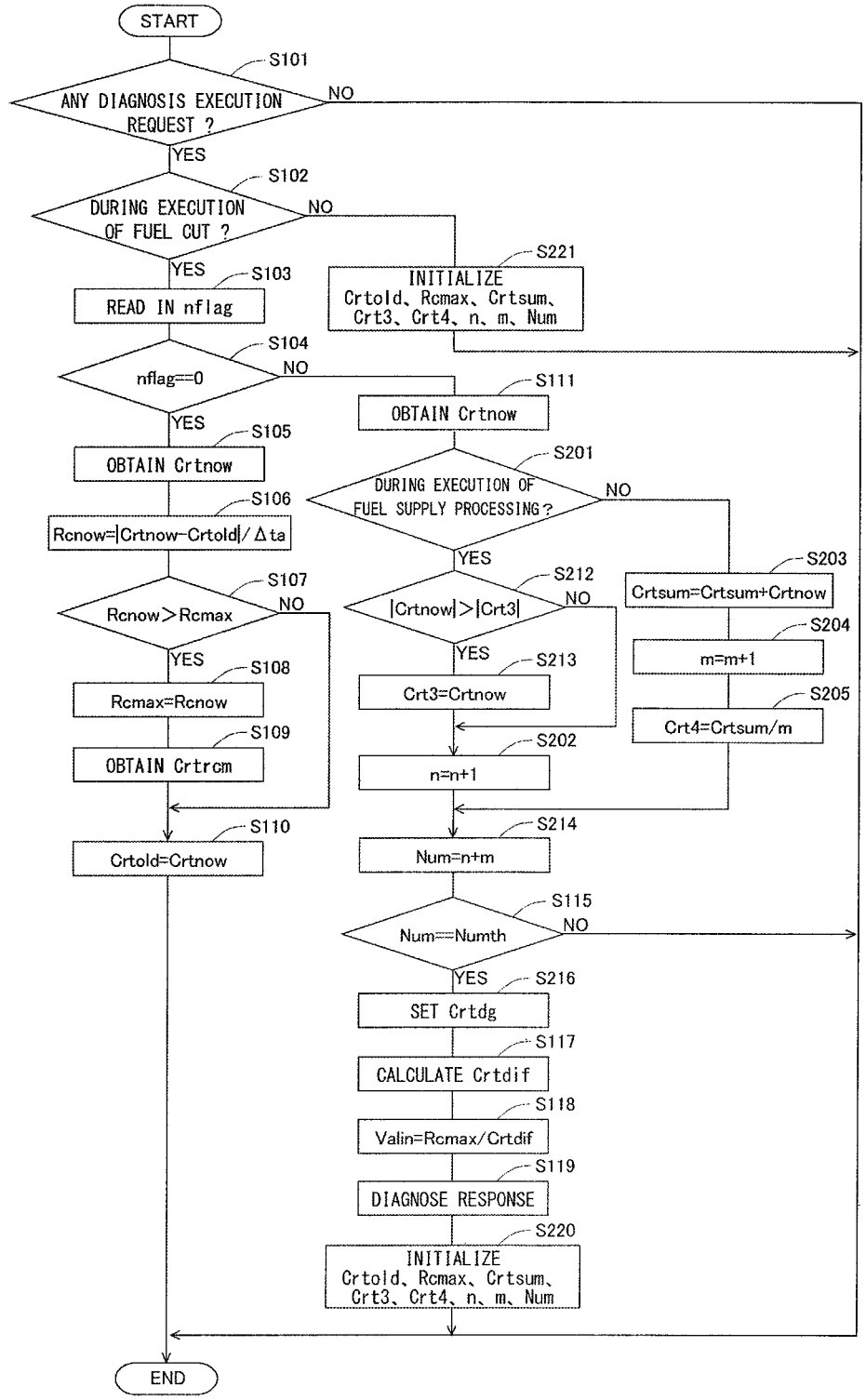
[FIG. 8]

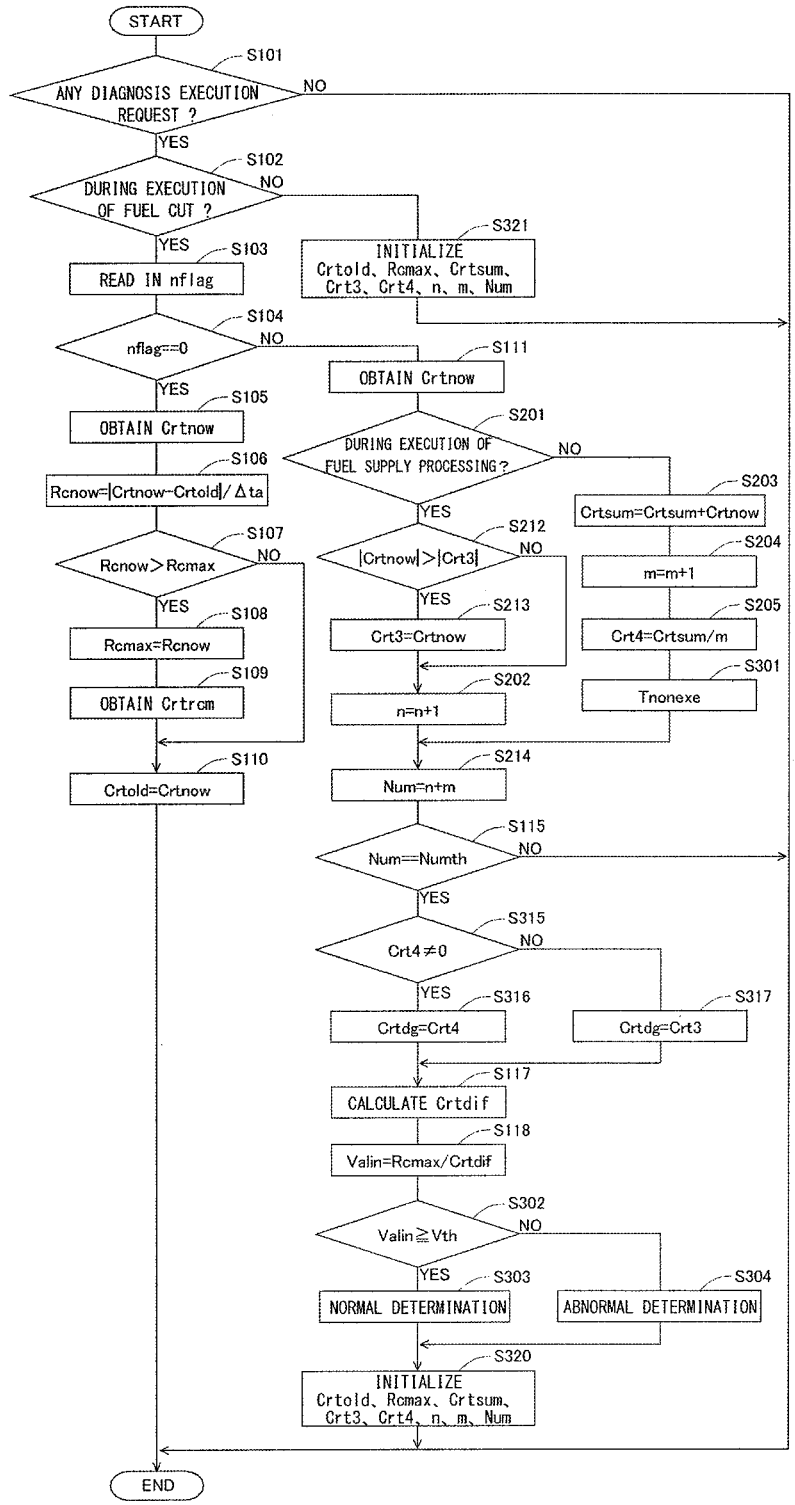
[FIG. 9]

[FIG. 10]
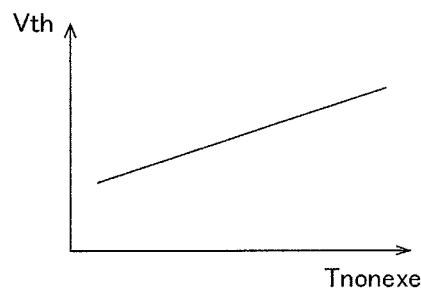
[FIG 11A]
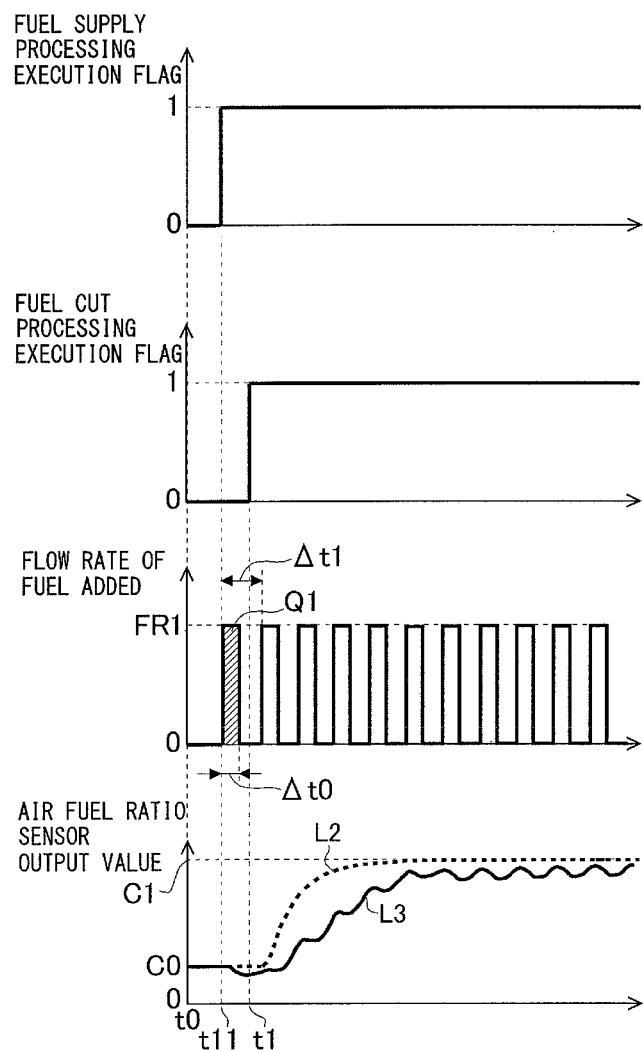

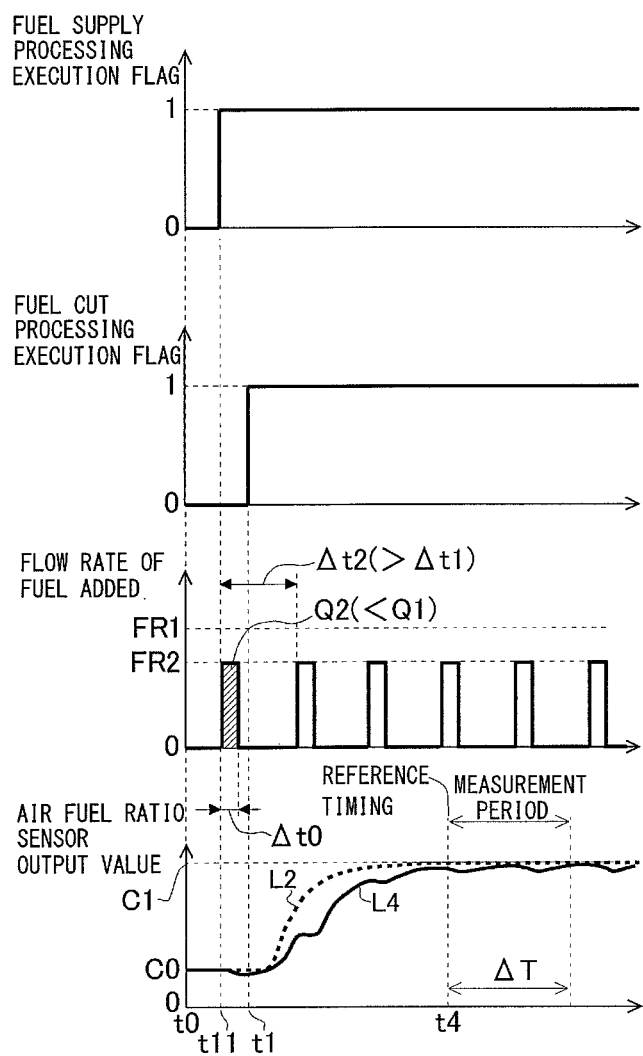

[FIG. 12]
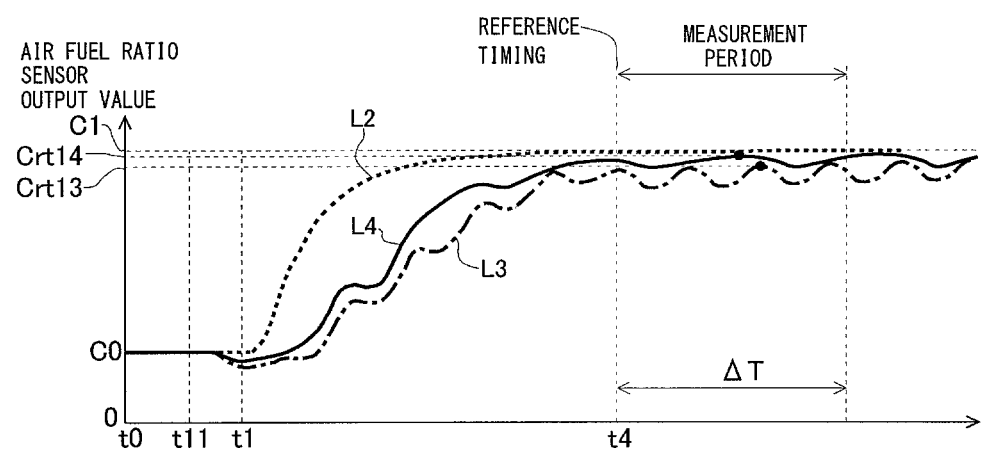

[FIG. 13]
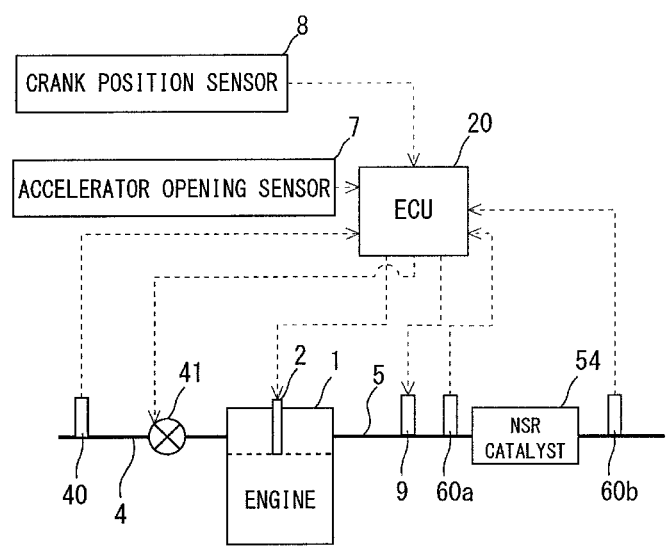

[FIG. 14]
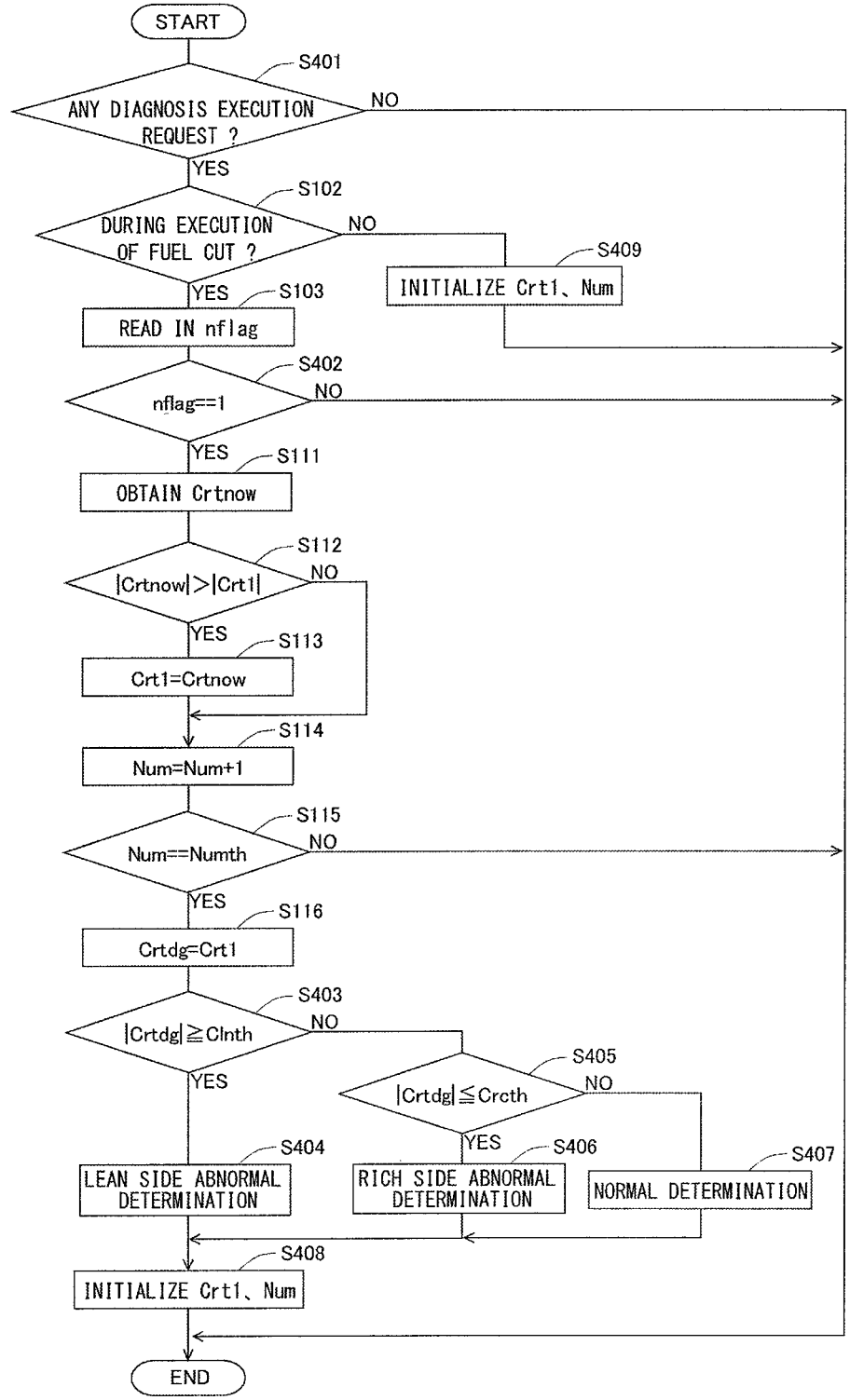

DIAGNOSTIC APPARATUS FOR EXHAUST GAS SENSOR

CROSS-REFERENCE TO RELATED APPLICATIONS

This application claims priority to Japanese Patent Application No. 2017-172109 filed on Sep. 7, 2017, the entire contents of which are incorporated by reference.

BACKGROUND

Technical Field

The present disclosure relates to a diagnostic apparatus for an exhaust gas sensor.

Description of the Related Art

An exhaust gas sensor in the form of an air fuel ratio sensor may be arranged in an exhaust system of an internal combustion engine, in order to control an air fuel ratio of an air fuel mixture in the internal combustion engine. In addition, in an exhaust gas purification apparatus using an NOx selective catalytic reduction catalyst, an exhaust gas sensor in the form of an NOx sensor may be arranged in an exhaust system of an internal combustion engine, in order to control an amount of addition of a reducing agent. Then, with these exhaust gas sensors, output signals each corresponding to an oxygen concentration of exhaust gas are outputted, so that an air fuel ratio of the exhaust gas in the air fuel ratio sensor and a concentration of NOx in the exhaust gas in the NOx sensor are calculated based on the output values of the output signals, respectively.

Here, in the above-mentioned exhaust gas sensors, when an output gain of each sensor changes, abnormality in the form of deterioration in response of the sensor may not be able to be diagnosed in an accurate manner. Accordingly, with the technology described in patent literature 1, converged value of the air fuel ratio sensor output during the execution of fuel cut processing is detected, and based on this converged value, a correction is made on a response parameter, which is a parameter for diagnosing abnormality with respect to the response of the air fuel ratio sensor. Then, the abnormality with respect to the response of the air fuel ratio sensor is diagnosed based on the response parameter thus corrected. This alleviates the influence of a change in the output gain of the air fuel ratio sensor with respect to the abnormality diagnosis of the response of the sensor. Here, with the technology described in patent literature 1, as the above-mentioned converged value, there is used an average (or a mean) value of the output value of the air fuel ratio sensor in a period of time (a predetermined period of time) after it is determined that the output value of the air fuel ratio sensor has been converged during the execution of the fuel cut processing until a predetermined time elapses.

In addition, there has also been known a technology in which a predetermined reducing component such as fuel is added into exhaust gas discharged from an internal combustion engine in order to maintain the function of an exhaust gas purification catalyst in the internal combustion engine, (for example, patent literatures 2 and 3).

CITATION LIST

Patent Literature

Patent Literature 1: Japanese Patent Application Laid-Open No. 2016-056731

Patent Literature 2: Japanese Patent Application Laid-Open No. 2011-117462

Patent Literature 3: Japanese Patent Application Laid-Open No. 2003-214245

SUMMARY

In an internal combustion engine having an exhaust gas sensor which generates an output corresponding to an oxygen concentration of exhaust gas, when oxygen concentration processing is carried out in which the oxygen concentration of the exhaust gas finally converges to a predetermined concentration as the oxygen concentration rises, as in the case of fuel cut processing for example, the output value of the exhaust gas sensor converges to a predetermined value. Then, the diagnosis of the exhaust gas sensor may be made based on the converged value of the sensor output at this time. Here, the ratio of a change in the magnitude of an output current (i.e., the magnitude of a limiting current value in the case of a limiting current type exhaust gas sensor) with respect to a change in the oxygen concentration of the exhaust gas flowing around the exhaust gas sensor is represented as an output gain of the sensor, and when the exhaust gas sensor is diagnosed based on the converged value of the sensor output as mentioned above, the diagnosis of the exhaust gas sensor will be carried out in consideration of the output gain of the sensor.

On the other hand, as mentioned above, fuel may be added to exhaust gas for the purpose of maintaining the function of an exhaust gas purification catalyst of an internal combustion engine. In addition, if a fuel addition valve is arranged in an exhaust passage, for example, fuel may be added to the exhaust passage from the fuel addition valve for preventing clogging of the fuel addition valve. Then, the function of an exhaust system of the internal combustion engine can be maintained by such an addition of fuel being carried out. Here, when fuel is added to the exhaust gas, the oxygen concentration of the exhaust gas may vary in accordance with the addition of the fuel. Accordingly, when such an addition of fuel is carried out during the execution of the above-mentioned oxygen concentration processing, the output of the exhaust gas sensor is also varied in accordance with the variation in the oxygen concentration of the exhaust gas accompanying the addition of fuel, during which it becomes difficult for the output of the exhaust gas sensor to converge. In this case, when the diagnosis of the exhaust gas sensor is tried to be made based on the converged value of the sensor output (i.e., taking the output gain of the sensor into consideration), there is a fear that the accuracy of the diagnosis may drop.

Here, in the technologies described in the prior art literatures, etc., by using the mean value of the output value of the air fuel ratio sensor in the predetermined period of time, the converged value of the air fuel ratio sensor output is tried to be calculated during the execution of the fuel cut processing, and in cases where the above-mentioned addition of fuel is further carried out during the execution of the above-mentioned oxygen concentration processing, there is still room for improvement in maintaining the diagnostic accuracy of the exhaust gas sensor in a proper or satisfactory manner.

The present disclosure has been made in view of the problems as referred to above, and has for its object to diagnose an exhaust gas sensor with high accuracy as much as possible, while maintaining the function of an exhaust system of an internal combustion engine.

Solution to Problem

In order to attain the above-mentioned object, a diagnostic apparatus for an exhaust gas sensor according to the present disclosure is applied to an internal combustion engine which is provided with: at least one exhaust gas sensor that is arranged in an exhaust passage of the internal combustion engine, and outputs an output signal corresponding to an oxygen concentration of exhaust gas; a fuel supplier that supplies fuel into said exhaust passage at a location upstream of said at least one exhaust gas sensor; and a controller comprising at least one processor configured to: carry out predetermined fuel supply processing in which fuel is repeatedly supplied from said fuel supplier at a predetermined period; and carry out predetermined oxygen concentration processing which is different from said predetermined fuel supply processing, and in which the oxygen concentration of the exhaust gas is raised to a predetermined oxygen concentration, and in which a state where the oxygen concentration of the exhaust gas becomes said predetermined oxygen concentration is formed for a predetermined period of time or more; wherein a diagnosis of said at least one exhaust gas sensor is carried out based on an output value of said at least one exhaust gas sensor. Then, said controller is further configured to diagnose said at least one exhaust gas, sensor in such a manner that when said predetermined fuel supply processing is carried out in a measurement period which is a period of time from a predetermined reference timing after a timing at which the rise of the oxygen concentration of the exhaust gas accompanying the execution of said predetermined oxygen concentration processing converges until said predetermined period of time elapses, the controller sets as a diagnostic output value a first output value, which is an output value at the side of the highest oxygen concentration in the output value of said at least one exhaust gas sensor in said measurement period, and performs the diagnosis of said at least one exhaust gas sensor based on the diagnostic output value.

In said internal combustion engine, when the predetermined oxygen concentration processing is carried out, the oxygen concentration of the exhaust gas rises. For that reason, said diagnostic apparatus for an exhaust gas sensor according to the present disclosure diagnoses the at least one exhaust gas sensor based on the output value of the at least one exhaust gas sensor which changes with the execution of the predetermined oxygen concentration processing. Here, in the diagnosis of the response of the at least one exhaust gas sensor, when an output gain of the sensor changes, abnormality in the response of the sensor may not be able to be diagnosed in an accurate manner. Accordingly, when abnormality in the response of the at least one exhaust gas sensor is diagnosed, such diagnosis may be carried out in consideration of the output gain of the sensor, for example. In addition, the magnitude of the output gain of the sensor itself may be diagnosed.

Then, in said internal combustion engine, if only the predetermined oxygen concentration processing is carried out, the oxygen concentration of the exhaust gas is converged to the predetermined oxygen concentration. Moreover, a state where the oxygen concentration of the exhaust gas becomes the predetermined oxygen concentration is formed for a predetermined period of time. Said diagnostic apparatus for an exhaust gas sensor according to the present disclosure diagnoses the at least one exhaust gas sensor based on the output value of the at least one exhaust gas sensor which is outputted according to the oxygen concentration of the exhaust gas in this predetermined period of time. Specifically, the diagnosis of the at least one exhaust gas sensor is performed based on the output value of the at least one exhaust gas sensor in the measurement period which is the period of time from the predetermined reference timing after the timing at which the rise of the oxygen concentration of the exhaust gas accompanying the execution of the predetermined oxygen concentration processing converges until said predetermined period of time elapses. Accordingly, if only the predetermined oxygen concentration processing is carried out, the state where the oxygen concentration of the exhaust gas becomes the predetermined oxygen concentration is formed in this measurement period. Here, when predetermined output value in the exhaust gas sensor output in the measurement period is set as a diagnostic output value, in cases where only the predetermined oxygen concentration processing is carried out, said diagnostic output value represents a magnitude of an output current corresponding to the predetermined oxygen concentration. Accordingly, when the at least one exhaust gas sensor is diagnosed based on the diagnostic output value, the diagnosis of the at least one exhaust gas sensor will be carried out in consideration of the output gain of the sensor. This alleviates the influence of a change in the output gain of the at least one exhaust gas sensor with respect to the diagnosis of the at least one exhaust gas sensor. Here, note that the predetermined reference timing is defined as a predetermined timing after the timing at which the rise of the oxygen concentration of the exhaust gas accompanying the execution of the predetermined oxygen concentration processing converges in this manner, and even if the predetermined fuel supply processing is carried out with the predetermined oxygen concentration processing, the rise of the oxygen concentration of the exhaust gas accompanying the execution of the predetermined oxygen concentration processing is assumed to be converged at the predetermined reference timing.

On the other hand, in said internal combustion engine, the predetermined fuel supply processing is carried out independently from the predetermined oxygen concentration processing. Then, when the predetermined fuel supply processing is carried out, the oxygen concentration of the exhaust gas passing through the at least one exhaust gas sensor decreases in a periodic manner according to the fuel repeatedly supplied at a predetermined period or interval. This is because when the fuel is supplied to the exhaust passage of the internal combustion engine, the ratio of oxygen occupied in the exhaust gas flowing through the exhaust passage drops corresponding to the amount of fuel supplied, even if the amount of oxygen flowing through the exhaust passage does not change. Also, this is because if an oxidation catalyst is arranged in the exhaust passage of the internal combustion engine and the at least one exhaust gas sensor is arranged at the downstream side of the oxidation catalyst, as will be described later, the oxygen concentration of the exhaust gas at the downstream side of the oxidation catalyst decreases due to the consumption of oxygen by the reaction of fuel and oxygen in the oxidation catalyst. Accordingly, when the predetermined fuel supply processing is carried out in the measurement period, the output value of the at least one exhaust gas sensor in the measurement period will vary in a periodic manner.

In this case, it is considered that the at least one exhaust gas sensor is diagnosed by using, as said diagnostic output value, a mean value of the output value of the at least one exhaust gas sensor in the measurement period. However, in the present disclosure, it has been found that when the predetermined fuel supply processing is carried out in the measurement period, it is possible to diagnose the at least one exhaust gas sensor with high accuracy as much as possible, while maintaining the function of an exhaust system of the internal combustion engine, by diagnosing the at least one exhaust gas sensor by using, as the diagnostic output value, the first output value which is the output value at the side of the highest oxygen concentration in the output value of the at least one exhaust gas sensor in the measurement period, rather than by diagnosing the at least one exhaust gas sensor by using said mean value as the diagnostic output value. This will be explained below in detail.

Because the predetermined fuel supply processing is processing in which fuel is supplied in a repeated manner at the predetermined period or interval, as mentioned above, the oxygen concentration of the exhaust gas passing through the at least one exhaust gas sensor is varied in a periodic manner between a state where the oxygen concentration of the exhaust gas has been decreased according to the fuel supplied by this processing (i.e., a low oxygen concentration state), and a state where the oxygen concentration of the exhaust gas is higher than the low oxygen concentration state (i.e., a high oxygen concentration state). Then, the highest oxygen concentration value in such a periodic change becomes a value relatively close to the oxygen concentration of the exhaust gas (this being said predetermined oxygen concentration, and hereinafter being sometimes referred to as a "reference concentration") in the measurement period in the case of assuming that only the predetermined oxygen concentration processing is carried out. In other words, it can be said that said first output value is a value relatively close to the output value of the at least one exhaust gas sensor (hereinafter, sometimes referred to as a "reference output value") corresponding to the reference concentration in the output value of the at least one exhaust gas sensor in the measurement period. In contrast to this, the mean value of the output value of the at least one exhaust gas sensor in the measurement period includes no small influence at the time when the oxygen concentration of the exhaust gas is in the low oxygen concentration state, so the mean value becomes a value which is deviated from the reference output value in comparison with the first output value.

Here, when the at least one exhaust gas sensor is diagnosed by using the reference output value as the diagnostic output value, the influence of the change of the output gain of the sensor with respect to the diagnosis may be eliminated as correctly as possible, but when the diagnostic output value deviates from the reference output value, it becomes difficult to eliminate the influence of the change of the output gain of the sensor with respect to the diagnosis correctly, thus giving rise to a fear that the diagnostic accuracy of the at least one exhaust gas sensor may decrease. In view of the above, when the predetermined fuel supply processing is carried out in the measurement period, it becomes possible to diagnose the at least one exhaust gas sensor with high accuracy as much as possible, by diagnosing the at least one exhaust gas sensor by using the first output value as the diagnostic output value. In addition, in cases where there is a fear that exhaust emissions may deteriorate resulting from a decrease in the temperature of the exhaust gas purification catalyst, for example, the predetermined fuel supply processing can be carried out in the measurement period, too. In that case, the function of the exhaust gas purification catalyst is maintained, thereby suppressing the deterioration of exhaust emissions. Moreover, for example, in cases where clogging may occur in a fuel addition valve arranged in the exhaust passage, the predetermined fuel supply processing may be carried out in the measurement period, too. In that case, the function of the fuel addition valve is maintained.

As described above, the diagnostic apparatus for an exhaust gas sensor according to the present disclosure makes it possible to diagnose the at least one exhaust gas sensor with high accuracy as much as possible, while maintaining the function of the exhaust system of the internal combustion engine.

In addition, when said predetermined fuel supply processing is not carried out in said measurement period, said controller may diagnose said at least one exhaust gas sensor by using as said diagnostic output value a second output value which is a mean value of the output value of said at least one exhaust gas sensor in said measurement period. When the predetermined fuel supply processing is not carried out in the measurement period, the oxygen concentration of the exhaust gas becomes a predetermined oxygen concentration (reference concentration). However, in general, the output value of a sensor can vary at predetermined variation, so even when the predetermined fuel supply processing is not carried out in the measurement period, the output value of the at least one exhaust gas sensor corresponding to the reference concentration in the measurement period may vary. Accordingly, in this case, it becomes possible to diagnose the at least one exhaust gas sensor with high accuracy as much as possible, by diagnosing the at least one exhaust gas sensor by using as the diagnostic output value the second output value which is the mean value of the output value of the at least one exhaust gas sensor in the measurement period.

Moreover, it is considered that if in the measurement period, there exist a time period in which the predetermined fuel supply processing is carried out, and a time period in which the predetermined fuel supply processing is not carried out, the at least one exhaust gas sensor is diagnosed based on the mean value of the output value of the at least one exhaust gas sensor in the time period in which the predetermined fuel supply processing is not carried out (hereinafter, referred to as a "non-execution period"). This is because in the non-execution period, the oxygen concentration of the exhaust gas tends to easily become the predetermined oxygen concentration (the reference concentration). However, in cases where the predetermined fuel supply processing having been carried out until then is terminated in the measurement period, for example, a predetermined delay can be included in a change of the oxygen concentration of the exhaust gas (specifically, a change in which the oxygen concentration varying in a periodic manner goes to the reference concentration) accompanying the termination of the predetermined fuel supply processing. Moreover, a predetermined delay can be included in a change of the output of the at least one exhaust gas sensor according to such an oxygen concentration change. Accordingly, in such a case, when the at least one exhaust gas sensor is diagnosed based on said mean value, there may occur a situation where the diagnostic accuracy decreases.

Accordingly, if in the measurement period, there exist a time period in which said predetermined fuel supply processing is carried out, and a time period in which said predetermined fuel supply processing is not carried out, said controller may diagnose said at least one exhaust gas sensor, by using as said diagnostic output value an output value at the higher oxygen concentration (i.e., a higher oxygen concentration output value), of a third output value which is an output value at the side of the highest oxygen concentration in the output value of said at least one exhaust gas sensor at the time when said predetermined fuel supply processing is carried out in said measurement period, and a fourth output value which is a mean value of the output value of said at least one exhaust gas sensor at the time when said predetermined fuel supply processing is not carried out in said measurement period. In that case, for example, even in cases where the non-execution period becomes a relatively short period just before the termination of the measurement period so that the measurement period terminates before the oxygen concentration of the exhaust gas goes to the reference concentration with the termination of the predetermined fuel supply processing, the at least one exhaust gas sensor can be diagnosed based on the output value closer to the reference output value, of the third output value and the fourth output value. With this, it becomes possible to diagnose the at least one exhaust gas sensor with high accuracy as much as possible, while maintaining the function of the exhaust system of the internal combustion engine.

On the other hand, when the non-execution period has a certain amount of length, the fourth output value tends to become relatively close to the reference output value. Accordingly, priority may be given to the fourth output value over the third output value. However, in this case, a time period in which the output value of the at least one exhaust gas sensor is integrated in order to calculate the fourth output value (e.g., the non-execution period) tends to become shorter than a time period in which the output value of the at least one exhaust gas sensor is integrated in order to calculate said second output value (e.g., the measurement period), and hence, even if the sensor output value is averaged, the influence of sensor errors such as output variation, etc., may not be able to be eliminated to a sufficient extent.

Accordingly, if in the measurement period, there exist the time period in which said predetermined fuel supply processing is carried out, and the time period in which said predetermined fuel supply processing is not carried out, said controller may set as said diagnostic output value the fourth output value which is the mean value of the output value of said at least one exhaust gas sensor at the time when said predetermined fuel supply processing is not carried out in said measurement period, and may diagnose said at least one exhaust gas sensor based on said diagnostic output value and the length of the time period in which said predetermined fuel supply processing is not carried out in said measurement period. In this case, the diagnosis of the at least one exhaust gas sensor can be carried out in consideration of the influence of sensor errors which can change according to the length of the non-execution period. With this, it becomes possible to diagnose the at least one exhaust gas sensor with high accuracy as much as possible while maintaining the function of the exhaust system of the internal combustion engine.

In addition, the diagnostic apparatus for an exhaust gas sensor according to the present disclosure wherein said controller may be further configured to calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value. Then, said controller may estimate the response of said at least one exhaust gas sensor based on said response index value.

Here, when the response of the at least one exhaust gas sensor drops or decreases, the absolute value of the rate of change of the output value of the at least one exhaust gas sensor becomes small. Accordingly, it is also considered that the response of the at least one exhaust gas sensor can be estimated based on the rate of change of the output value of the at least one exhaust gas sensor. However, in the at least one exhaust gas sensor of which the output gain has dropped for some reason, the response of the sensor has not dropped, but the absolute value of the rate of change of the output value of the sensor may drop. Accordingly, when the response of the at least one exhaust gas sensor is estimated based on only the rate of change of the output value of the sensor, there is a fear that the estimation accuracy may decrease.

In contrast to this, in the response index value calculated by said controller, the influence in the case of changing of the output gain is eliminated by dividing the maximum value of the absolute rate of change by the difference between the output value at the time when the absolute rate of change becomes the maximum value and the diagnostic output value. Accordingly, by estimating the response of the at least one exhaust gas sensor based on such an response index value, the response of the at least one exhaust gas sensor can be estimated with high accuracy as much as possible. Then, by estimating the response of the at least one exhaust gas sensor based on the response index value calculated by the use of the diagnostic output value, it becomes possible to diagnose the at least one exhaust gas sensor with high accuracy as much as possible while maintaining the function of the exhaust system of the internal combustion engine.

Further, said controller may diagnose the abnormality of the response of said at least one exhaust gas sensor based on said response index value. Here, when the abnormality of the response of the at least one exhaust gas sensor is diagnosed based on the response index value calculated using the diagnostic output value, it can be determined in a relatively accurate manner whether an abnormality has occurred in the response of the at least one exhaust gas sensor. In other words, it becomes possible to diagnose the at least one exhaust gas sensor with high accuracy as much as possible while maintaining the function of the exhaust system of the internal combustion engine.

Moreover, when based on the response index value, the response of the at least one exhaust gas sensor is estimated, or the abnormality of the response of the at least one exhaust gas sensor is diagnosed, priority may be given to the fourth output value over the third output value, as mentioned above. In this case, said controller may estimate the response of said at least one exhaust gas sensor or may diagnose the abnormality of the response of said at least one exhaust gas sensor, based on said response index value and the length of the time period in which said predetermined fuel supply processing is not carried out in said measurement period. In this case, too, it is possible to diagnose the at least one exhaust gas sensor with high accuracy as much as possible while maintaining the function of the exhaust system of the internal combustion engine.

Here, in the diagnostic apparatus for an exhaust gas sensor described thus far, when there is a predetermined diagnosis execution request with respect to said at least one exhaust gas sensor and when said predetermined oxygen concentration processing is carried out, the diagnosis of said at least one exhaust gas sensor by said controller may be carried out. When an execution condition for said predetermined fuel supply processing is satisfied and when there is no said predetermined diagnosis execution request with respect to said at least one exhaust gas sensor, said controller may carry out said predetermined fuel supply processing by setting an amount of supply of fuel to be supplied at one time to a first predetermined amount and by supplying fuel in a repeated manner at a first predetermined period, whereas when the execution condition for said predetermined fuel supply processing is satisfied and there is said predetermined diagnosis execution request with respect to said at least one exhaust gas sensor, and when said predetermined oxygen concentration processing is carried out, said controller may carry out said predetermined fuel supply processing by setting an amount of supply of fuel to be supplied at one time to a second predetermined amount smaller than said first predetermined amount and by supplying fuel in a repeated manner at a second predetermined period longer than said first predetermined period.

The first predetermined amount and the first predetermined period in said predetermined fuel supply processing are the amount of supply of fuel to be supplied at one time and the period or interval of the supply of fuel, respectively, which are set in normal time (e.g., set in such a manner that exhaust emissions can be suppressed as much as possible). Then, when fuel is supplied in a repeated manner at the first predetermined period by setting the amount of supply of fuel to be supplied at one time to the first predetermined amount, the oxygen concentration of the exhaust gas becomes easy to vary to a relatively large extent. Here, as mentioned above, when the oxygen concentration of the exhaust gas varies in the measurement period, the output value of the at least one exhaust gas sensor at that time will also be varied. For that reason, a situation in which the oxygen concentration of the exhaust gas varies to a relatively large extent in the measurement period is not preferable when the at least on exhaust gas sensor is diagnosed based on the output value of the at least one exhaust gas sensor in the measurement period.

Accordingly, in said diagnostic apparatus for an exhaust gas sensor, when the execution condition for the predetermined fuel supply processing is satisfied and there is the predetermined diagnosis execution request with respect to the at least one exhaust gas sensor, and when the predetermined oxygen concentration processing is carried out, the predetermined fuel supply processing is carried out by setting the amount of supply of fuel to be supplied at one time to the second predetermined amount smaller than the first predetermined amount and by supplying fuel in a repeated manner at the second predetermined period longer than the first predetermined period, as a result of which the variation of the oxygen concentration of the exhaust gas in the measurement period is made relatively small. With this, it is possible to diagnose the at least one exhaust gas sensor with high accuracy as much as possible while maintaining the function of the exhaust system of the internal combustion engine.

In addition, said internal combustion engine may be further provided with an exhaust gas purification catalyst group that is arranged in said exhaust passage, wherein said exhaust gas purification catalyst group may be composed of a plurality of, exhaust gas purification catalysts including a first exhaust gas purification catalyst in which a catalyst having an oxidation function is supported, and a second exhaust gas purification catalyst arranged in said exhaust passage at the downstream side of said first exhaust gas purification catalyst. Then, said fuel supplier may supply fuel to said exhaust passage at the upstream side of said first exhaust gas purification catalyst. Further, said at least one exhaust gas sensor may be composed of a plurality of exhaust gas sensors including a first exhaust gas sensor arranged in said exhaust passage between said first exhaust gas purification catalyst and said second exhaust gas purification catalyst, and a second exhaust gas sensor arranged in said exhaust passage at the downstream side of said second exhaust gas purification catalyst. In this case, when the execution condition for said predetermined fuel supply processing is satisfied and there is said predetermined diagnosis execution request with respect to said first exhaust gas sensor among said plurality of exhaust gas sensors, and when said predetermined oxygen concentration processing is carried out, said controller may carry out said predetermined fuel supply processing by setting the amount of supply of fuel to be supplied at one time to said second predetermined amount and by supplying fuel in a repeated manner at said second predetermined period, whereas when the execution condition for said predetermined fuel supply processing is satisfied and there is said predetermined diagnosis execution request with respect to said second exhaust gas sensor among said plurality of exhaust gas sensors, and when said, predetermined oxygen concentration processing is carried out, said controller may carry out said predetermined fuel supply processing by setting the amount of supply of fuel to be supplied at one time to said first predetermined amount and by supplying fuel in a repeated manner at said first predetermined period.

As described above, when the predetermined fuel supply processing is carried out, the oxygen concentration of the exhaust gas decreases in a periodic manner according to the fuel repeatedly supplied at the predetermined period or interval. Then, in said internal combustion engine, the degree of decrease of said oxygen concentration tends to easily become relatively large in the exhaust gas at the downstream side of the first exhaust gas purification catalyst. This is because the catalyst having an oxidation function is supported in the first exhaust gas purification catalyst and oxygen is consumed in said first exhaust gas purification catalyst by the reaction of fuel with oxygen in the first exhaust gas purification catalyst. However, the degree of such a periodic decrease of the oxygen concentration in the exhaust gas at the downstream side of the first exhaust gas purification catalyst tends to become smaller, as the exhaust gas moves away from the first exhaust gas purification catalyst to the downstream side. This is because the more the exhaust gas moves away from the first exhaust gas purification catalyst to the downstream side, the more easily the variation of the oxygen concentration resulting from the consumption of oxygen in the first exhaust gas purification catalyst tends to be alleviated.

Accordingly, when the predetermined fuel supply processing is carried out in the measurement period, the variation of the oxygen concentration of the exhaust gas passing through the first exhaust gas sensor becomes larger than the variation of the oxygen concentration of the exhaust gas passing through the second exhaust gas sensor. In this case, in the diagnosis of the exhaust gas sensors based on said diagnostic output value, the diagnostic accuracy with respect to the first exhaust gas sensor tends to become lower than the diagnostic accuracy with respect to the second exhaust gas sensor. Accordingly, when there is the predetermined diagnosis execution request with respect to the first exhaust gas sensor, the predetermined fuel supply processing is carried out by setting the amount of supply of fuel to be supplied at one time to the second predetermined amount and by supplying fuel in a repeated manner at the second predetermined period. With this, the variation of the oxygen concentration of the exhaust gas passing through the first exhaust gas sensor when diagnosing the first exhaust gas sensor is made relatively small, thereby making it possible to diagnose the exhaust gas sensors with high accuracy as much as possible while maintaining the function of the exhaust system of the internal combustion engine.

According to the present disclosure, it is possible to diagnose an exhaust gas sensor with high accuracy as much as possible while maintaining the function of an exhaust system of an internal combustion engine.

BRIEF DESCRIPTION OF DRAWINGS

FIG. 1 is a diagram showing the general configuration of an internal combustion engine and its intake and exhaust systems according to a first embodiment of the present disclosure.

FIG. 2 is an enlarged schematic cross sectional view in the vicinity of an air fuel ratio sensor in FIG. 1.

FIG. 3 is a longitudinal cross sectional view in the vicinity of a tip end of the air fuel ratio sensor.

FIG. 4 is a time chart showing the changes over time of a fuel cut processing execution flag and an output value of the air fuel ratio sensor at the time when fuel cut processing is carried out.

FIG. 5 is a time chart showing the changes over time of a fuel supply processing execution flag, a fuel cut processing execution flag and the output value of the air fuel ratio sensor at the time when fuel supply processing and fuel cut processing are carried out.

FIG. 6A is a time chart showing the change over time of the output value of the air fuel ratio sensor shown in FIG. 5, wherein an example is shown in which a mean value of the air fuel ratio sensor output value is calculated as a diagnostic output value.

FIG. 6B is a time chart showing the change over time of the output value of the air fuel ratio sensor shown in FIG. 5, wherein an example is shown in which a first output value of the air fuel ratio sensor is calculated as the diagnostic output value.

FIG. 7 is a flow chart showing a control flow which is executed by a diagnostic apparatus for an exhaust gas sensor according to a first embodiment of the present disclosure.

FIG. 8 is a flow chart showing a control flow which is executed by a diagnostic apparatus for an exhaust gas sensor according to a second modification of the first embodiment of the present disclosure.

FIG. 9 is a flow chart showing a control flow which is executed by a diagnostic apparatus for an exhaust gas sensor according to a third modification of the first embodiment of the present disclosure.

FIG. 10 is a graph showing a correlation between a non-execution period and a determination threshold value.

FIG. 11A is a diagram for explaining the fuel supply processing carried out when there is no predetermined diagnosis execution request with respect to the air fuel ratio sensor.

FIG. 11B is a diagram for explaining the fuel supply processing carried out when there is a predetermined diagnosis execution request with respect to the air fuel ratio sensor, in a fourth modification the first embodiment of the present disclosure.

FIG. 12 is a time chart showing the changes over time of the output value of the air fuel ratio sensor shown in FIG. 11A and FIG. 11B.

FIG. 13 is a diagram showing the general configuration of an internal combustion engine and its intake and exhaust systems according to a second embodiment of the present disclosure.

FIG. 14 is a flow chart showing a control flow which is executed by a diagnostic apparatus for an exhaust gas sensor according to a fourth embodiment of the present disclosure.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

First Embodiment (General Configuration of Internal Combustion Engine and its Intake and Exhaust Systems)

FIG. 1 is a diagram showing the general configuration of an internal combustion engine and its intake and exhaust systems according to a first embodiment of the present disclosure. The internal combustion engine, which is shown in FIG. 1 and denoted by 1, is a lean-burn internal combustion engine of spark ignition type using gasoline, etc., as fuel. However, the present disclosure can also be applied to a compression ignition type internal combustion engine (diesel engine).

The internal combustion engine 1 is provided with a fuel injection valve 2 and a spark plug 3. Here, note that the fuel injection valve 2 may be constructed so as to directly inject fuel into a cylinder, or may be constructed so as to inject fuel into an intake port of the cylinder.

The internal combustion engine 1 is connected to an intake passage 4. In the intake passage 4, there are arranged an air flow meter 40 and a throttle valve 41. The air flow meter 40 is a sensor that outputs an electrical signal corresponding to an amount (mass) of intake air (air) flowing in the intake passage 4. The throttle valve 41 is arranged in the intake passage 4 at the downstream side of the air flow meter 40. The throttle valve 41 serves to adjust the amount of intake air in the internal combustion engine 1 by changing the channel cross section of the intake passage 4.

The internal combustion engine 1 is connected to an exhaust passage 5. In the exhaust passage 5, there are arranged a fuel addition valve 9, a first air fuel ratio sensor 6a, an oxidation catalyst 51, a second air fuel ratio sensor 6b, an NOx selective catalytic reduction catalyst 52 (hereinafter, sometimes referred to as an "SCR catalyst 52"), a temperature sensor 53, and a third air fuel ratio sensor 6c in the order according to the flow of exhaust gas. Here, the temperature sensor 53 outputs an electrical signal corresponding to the temperature of the exhaust gas. In addition, the first air fuel ratio sensor 6a, the second air fuel ratio sensor 6b, and the third air fuel ratio sensor 6c output electrical signals corresponding to the air fuel ratios of the exhaust gas, and the details thereof will be described later. Here, note that in this embodiment, these air fuel ratio sensors each correspond to at least one exhaust gas sensor in the present disclosure. However, the at least one exhaust gas sensor in the present disclosure is not limited to the air fuel ratio sensor(s), as will be described later. Moreover, in this embodiment, the fuel addition valve 9 corresponds to a fuel supplier in the present disclosure. However, the fuel supplier in the present disclosure is not limited to the fuel addition valve 9, as will be described later.

The fuel addition valve 9 adds fuel into the exhaust gas flowing through the exhaust passage 5. The oxidation catalyst 51 oxidizes HC, CO, etc., which flow into the catalyst. The SCR catalyst 52 reduces NOx flowing into the catalyst. Specifically, ammonia produced by the hydrolyzation of urea supplied from an unillustrated urea water addition valve adsorbs to the SCR catalyst 52, so that NOx in the exhaust gas is reduced by using the ammonia thus adsorbed as a reducing agent. Here, when the temperature of the SCR catalyst 52 drops lower than an activation temperature of the catalyst, the NOx reduction ability of the catalyst 52 will drop. Accordingly, in this embodiment, in order to maintain the temperature of the SCR catalyst 52 higher than the activation temperature of the catalyst, the addition of fuel from the fuel addition valve 9 is carried out. The details of this fuel addition will be described later.

An electronic control unit (ECU) 20 is provided in combination with the internal combustion engine 1. This ECU 20 is a unit that controls an operating state of the internal combustion engine 1, etc. A variety of kinds of sensors such as an accelerator opening sensor 7, a crank position sensor 8, etc, in addition to the air flow meter 40, the first air fuel ratio sensor 6a, the second air fuel ratio sensor 6b and the third air fuel ratio sensor 6c mentioned above are electrically connected to the ECU 20. The accelerator opening sensor 7 is a sensor which outputs an electrical signal correlated with an amount of operation (accelerator opening) of an unillustrated accelerator pedal. The crank position sensor 8 is a sensor which outputs an electrical signal correlated with a rotational position of an engine output shaft (crankshaft) of the internal combustion engine 1. Then, the output signals of these sensors are inputted to the ECU 20. The ECU 20 derives an engine load of the internal combustion engine 1 based on the output signal of the accelerator opening sensor 7, and also derives an engine rotational speed of the internal combustion engine 1 based on the output signal of the crank position sensor 8. In addition, the ECU 20 estimates a flow rate of the exhaust gas discharged from the internal combustion engine 1 based on the output value of the air flow meter 40, and estimates a temperature of the SCR catalyst 52 (hereinafter, also sometimes referred to as an "SCR catalyst temperature") based on the output value of the temperature sensor 53.

In addition, a variety of kinds of devices such as the fuel injection valve 2, the spark plug 3, the fuel addition valve 9, the throttle valve 41 and so on are electrically connected to the ECU 20. Thus, these variety of kinds of devices are controlled by the ECU 20. In this embodiment, when the ECU 20 detects by the output signal from the accelerator opening sensor 7 that accelerator-off (release of the accelerator pedal) has been performed, so-called fuel cut processing is carried out in which fuel injection from the fuel injection valve 2 and ignition of the spark plug 3 are stopped during the operation of the internal combustion engine 1. Then, when the fuel cut processing is carried out, the oxygen contained in the air sucked into the cylinder is discharged from the cylinder, without being burnt in the cylinder, so the oxygen concentration of the exhaust gas becomes higher than before. In other words, the oxygen concentration of the exhaust gas rises up to an oxygen concentration comparable to that of the atmosphere (i.e., this oxygen concentration corresponds to a predetermined oxygen concentration in the present disclosure). Here, note that in this embodiment, the fuel cut processing corresponds to predetermined oxygen concentration processing in the present disclosure, and the ECU 20 functions as a controller according to the present disclosure, by carrying out the fuel cut processing. However, the predetermined oxygen concentration processing in the present disclosure is not limited to the fuel cut processing, as will be described later.

Here, as mentioned above, in order to maintain the temperature of the SCR catalyst 52 higher than the activation temperature of the catalyst, the addition of fuel from the fuel addition valve 9 is carried out. Specifically, the ECU 20 adds fuel from the fuel addition valve 9 in a repeated manner at a predetermined period or interval. Here, note that such processing to be carried out by the ECU 20 is hereinafter referred to as "fuel supply processing" Here, the ECU 20 determines based on the estimated SCR catalyst temperature whether an execution condition for the fuel supply processing has been satisfied, and at the same time, can adjust an amount of addition of fuel to be added at one time and a time period or interval of the addition of fuel in the fuel supply processing based on the estimated SCR catalyst temperature. Then, when the fuel supply processing is carried out by the ECU 20, the fuel is oxidized in the oxidation catalyst 51 to generate heat accordingly. Thereafter, the heat thus generated is supplied to the SCR catalyst 52 arranged in the exhaust passage 5 at the downstream side of the oxidation catalyst 51, whereby the temperature of the SCR catalyst 52 is maintained higher than the activation temperature of the catalyst. Here, note that the ECU 20 functions as a controller according to the present disclosure, by carrying out the fuel supply processing.

Moreover, when the fuel cut processing is carried out and the execution condition for the fuel supply processing is satisfied, the ECU 20 may carry out the fuel supply processing by injecting fuel from the fuel injection valve in a repeated manner at the predetermined period or interval. At this time, ignition by the spark plug 3 is stopped, and the fuel supplied into the cylinder can not be burnt in the cylinder, so the fuel supply processing will be carried out after attaining the purpose of the fuel cut processing. Accordingly, in such a case, it is assumed in this description that the fuel cut processing is continued. Thus, in cases where the fuel supply processing is carried out using the fuel injection valve 2, the fuel injection valve 2 corresponds to the fuel supplier in the present disclosure.

Here, note that in this embodiment, in order to maintain the temperature of the SCR catalyst 52 higher than the activation temperature of the catalyst, the fuel addition processing is carried out. However, the fuel supply processing may be carried out for purposes other than the functional maintenance of the SCR catalyst 52. For example, the ECU 20 may add fuel from the fuel addition valve 9 in a repeated manner at the predetermined period for prevention of clogging of the fuel addition valve 9. In other words, the function of the exhaust system of the internal combustion engine can be maintained by the predetermined fuel supply processing according to the present disclosure being carried out.

(Structure of the Air Fuel Ratio Sensor)

Next, the structures of the first air fuel ratio sensor 6a, the second air fuel ratio sensor 6b and the third air fuel ratio sensor 6c will be briefly explained based on FIG. 2 and FIG. 3. Here, these air fuel ratio sensors have the same structure as one another, so they are each simply referred to as an "air fuel ratio sensor" in the following explanation of these air fuel ratio sensors. Here, note that the air fuel ratio sensors in this embodiment are each a limiting current type air fuel ratio sensor. Then, FIG. 2 is an enlarged schematic sectional view in the vicinity of each air fuel ratio sensor in FIG. 1, and FIG. 3 is a longitudinal sectional view in the vicinity of a tip end portion of the air fuel ratio sensor.

In FIG. 2, the air fuel ratio sensor is composed of a sensor body 100 to be described later, and a protective cover 10 which is a heat-resistant housing member covering the sensor body 100, with a part thereof being exposed to the exhaust passage 5. The sensor body 100 is covered with the protective cover 10, so that its mechanical strength is ensured.

Then, as shown in FIG. 3, the protective cover 10 is composed of an inner cover 10a and an outer cover 10b. Then, a plurality of vent holes 10c are formed in the surface of each of these inner and outer covers 10a, 10b, so that the inside and outside of the protective cover 10 are made in communication with each other. That is, the air fuel ratio sensor is constructed so that the exhaust gas circulating or flowing in the exhaust passage 5 passes through the vent holes 10c in the protective cover 10 and reaches the sensor body 100. Here, note that in FIG. 3, the protective cover 10 has a dual structure, but it may have a single structure.

Next, the schematic construction of the sensor body 100 will be explained. The sensor body 100 is provided with a sensor element 11 which is composed of an oxygen ion conductive solid electrolyte. The sensor element 11 is composed of zirconium oxide (zirconia), for example. Then, the sensor element 11 is formed on one side surface thereof with an exhaust gas side electrode 12 which is exposed to the exhaust gas, and on the other side surface thereof with an atmosphere side electrode 13 which is exposed to the atmosphere. These exhaust gas side electrode 12 and atmosphere side electrode 13 are each composed of a metallic material of high catalytic activity, such as platinum. Thus, the exhaust gas side electrode 12 and the atmosphere side electrode 13 are formed in this manner, whereby the sensor element 11 is sandwiched by a pair of electrodes.

Then, a diffusion rate controlling layer 14 is laminated on one side surface of the exhaust side electrode 12 opposite to its side surface near the sensor element 11. The diffusion rate controlling layer 14 is a member which is composed of a porous material such as ceramics, etc., and which has a function to control the rate or speed of diffusion of the exhaust gas. Also, a protective layer 16 is laminated on one side surface of the diffusion rate controlling layer 14 opposite to its side surface near the sensor element 11. Then, a gas chamber 15 is formed between the sensor element 11 and the diffusion rate controlling layer 14. Here, note that it is not necessarily required to form the gas chamber 15, but it may instead be constructed so that the diffusion rate controlling layer 14 is in direct contact with the surface of the exhaust side electrode 12.

In addition, a heater layer 17 is laminated on the other side surface of the sensor element 11. A heater 18 is embedded in the heater layer 17, and the heater 18 can be supplied with electric power from an unillustrated outside electric circuit, so that it can heat the sensor body 100. Here, note that this electric circuit is electrically connected to the ECU 20, so that the electric power supplied to the heater 18 is controlled by the ECU 20. Then, an atmospheric chamber 19 is formed between the sensor element 11 and the heater layer 17. The atmospheric chamber 19 is placed in communication with the atmosphere through unillustrated atmospheric holes, so that even in state where the air fuel ratio sensor 10 is arranged in the exhaust passage 5, the atmosphere side electrode 13 is maintained in a state exposed to the atmosphere.

In such an air fuel ratio sensor, the exhaust gas introduced into the interior of the protective cover 10 from the vent holes 10c passes through the diffusion rate controlling layer 14, and reaches the exhaust gas side electrode 12. Then, when an application voltage is applied between the exhaust gas side electrode 12 and the atmosphere side electrode 13, oxygen in the exhaust gas or oxygen in the atmosphere becomes oxygen ions, which propagate through the sensor element 11. Thus, the air fuel ratio of the exhaust gas is calculated based on a saturation current value (limiting current value) at this time.

Here, note that the first air fuel ratio sensor 6a, the second air fuel ratio sensor 6b, and the third air fuel ratio sensor 6c are the limiting current type air fuel ratio sensors, respectively, as mentioned above, but the air fuel ratio sensors in this embodiment are not limited to the limiting current type air fuel ratio sensors, as long as the output current thereof changes linearly with respect to the air fuel ratio of the exhaust gas. In addition, the first air fuel ratio sensor 6a, the second air fuel ratio sensor 6b, and the third air fuel ratio sensor 6c may be air fuel ratio sensors which are different in structure from one another.

(Response Diagnosis of Air Fuel Ratio Sensor)

In this embodiment, the response of each air fuel ratio sensor is diagnosed. Here, the ECU 20, which is a diagnostic apparatus for an exhaust gas sensor according to the present disclosure, calculates a response index value having a correlation with the response of each air fuel ratio sensor, in order to eliminate the influence in the case of changing of an output gain of the air fuel ratio sensor thereby to diagnose the response of the sensor. Then, the response of the sensor is diagnosed based on this response index value. Here, note that the output gain represents a ratio of a change of the magnitude of an output current (i.e., the magnitude of a limiting current value) with respect to a change of the air fuel ratio of the exhaust gas flowing around the air fuel ratio sensor. Hereinafter, a calculation technique for the response index value will be explained.

FIG. 4 shows the changes over time of a fuel cut processing execution flag and the output value of the air fuel ratio sensor at the time when the fuel cut processing is carried out in the internal combustion engine 1. Here, in the control shown in FIG. 4, the output value of the air fuel ratio sensor, which changes with the execution of the fuel cut processing from the start of the execution of the fuel cut processing, converges at a time point t4 to be described later. Here, note that this time point t4 is referred to as a reference timing. Thus, in FIG. 4, there are shown the changes over time of an absolute value of the rate of change (hereinafter, sometimes referred to as an "absolute rate of change") of the output value of the air fuel ratio sensor in a period of time from the start of the execution of the fuel cut processing to the reference timing and a maximum value of the absolute rate of change (hereinafter, sometimes referred to as a "maximum absolute rate of change"), together with the changes over time of the fuel cut processing execution flag and the output value of the air fuel ratio sensor. Here, the output value of the air fuel ratio sensor represents the output of the second air fuel ratio sensor 6b in the above-mentioned FIG. 1 as an example, and the absolute rate of change and the maximum absolute rate of change represent values based on the output value of the second air fuel ratio sensor 6b as examples.

In the control shown in FIG. 4, from a time point t0 to a time point t1, the internal combustion engine 1 performs normal operation (at this time, the fuel cut processing and the fuel supply processing are not carried out). At this time, the air fuel ratio of the exhaust gas becomes an air fuel ratio according to a normal operation state of the internal combustion engine 1, and in FIG. 4, the output value of the air fuel ratio sensor is substantially fixed at C0. Then, when the fuel cut processing execution flag changes from 0 to 1 at the time point t1 and the ECU 20 carries out fuel cut processing, the air fuel ratio of the exhaust gas changes to a leaner side than before, after the lapse of a certain amount of delay time. As a result, the output value of the air fuel ratio sensor begins to increase from C0.

Then, in the process of increasing in the output value of the air fuel ratio sensor (hereinafter, sometimes referred to as sensor output value), there is a tendency, that the increase in the sensor output value becomes relatively slow, immediately after the start of the increase in the sensor output value, and the increase in the sensor output value becomes large after a certain amount of time has elapsed from the start of the increase in the sensor output value. For that reason, at a time point t2, the output value of the air fuel ratio sensor begins to increase from C0, and thereafter, the absolute rate of change thereof becomes larger, and at a time point t3, the absolute rate of change becomes R1. Then, after the time point t3, the absolute rate of change decreases with the lapse of time, so that the output value of the air fuel ratio sensor is converged to C1 at a time point t4 (reference timing) at which the absolute rate of change thereof becomes substantially zero.

Here, the ECU 20 obtains the output value of the air fuel ratio sensor in the process of increasing in the output value of the air fuel ratio sensor, and calculates the absolute rate of change thereof. Then, the maximum absolute rate of change is calculated based on the absolute rate of change. In FIG. 4, the maximum value of the absolute rate of change (the maximum absolute rate of change) in a period of time from the start of the execution of the fuel cut processing (time point t1) to the reference timing (time point t4) is R1. In addition, the ECU 20 calculates the diagnostic output value based on the output value of the air fuel ratio sensor during the execution of the fuel cut processing and in a period of time from the reference timing to the lapse of a predetermined period of time ΔT (hereinafter, sometimes referred to as a "measurement period"). Here, the diagnostic output value is a predetermined output value in the air fuel ratio sensor output in the measurement period, and as shown in FIG. 4, when the fuel supply processing is not carried out, a converged value of the output value of the air fuel ratio sensor becomes the diagnostic output value. Here, note that a calculation technique for the diagnostic output value at the time when the fuel supply processing is carried out in the measurement period will be described later.

Then, the ECU 20 divides the maximum absolute rate of change by a difference between the output value of the air fuel ratio sensor at the time when the absolute rate of change becomes the maximum absolute rate of change, and the diagnostic output value. Here, the rate of change of the output value of the air fuel ratio sensor tends to have a correlation with the response of the sensor, so the maximum absolute rate of change is a value having a correlation with the response of the sensor. Further, the influence in the case of changing of the output gain of the air fuel ratio sensor is eliminated by dividing the maximum absolute rate of change by the difference between the output value at the time when the absolute rate of change becomes the maximum value and the diagnostic output value. In other words, the value calculated in this manner becomes the response index value. Accordingly, by diagnosing the response of the air fuel ratio sensor based on such an response index value, the response of the sensor can be diagnosed with accuracy.

However, if during the execution of the fuel cut processing, the addition of fuel from the fuel addition valve 9 is carried out in order to maintain the temperature f the SCR catalyst 52 higher than the activation temperature of the catalyst, the output value of the air fuel ratio sensor in the measurement period varies with this fuel supply processing, so with the calculation technique using the converged value of the output value of the air fuel ratio sensor as the diagnostic output value as mentioned above, it becomes difficult to calculate the response index value. This will be explained based on the following FIG. 5.

FIG. 5 is a time chart showing the changes over time of a fuel supply processing execution flag, the fuel cut processing execution flag and the output value of the air fuel ratio sensor at the time when the fuel supply processing and the fuel cut processing are carried out in the internal combustion engine 1. Here, note that in the changes over time of the output value of the air fuel ratio sensor in FIG. 5, a line L1 represented by a solid line shows the change over time in the case where the fuel supply processing is carried out, and a line L2 represented by a broken line shows as reference the change over time in the case where the fuel supply processing is not carried out (i.e., the same as in the case of the change over time of the output value of the air fuel ratio sensor shown in the above-mentioned FIG. 4). In addition, the output value of the air fuel ratio sensor represents the output of the second air fuel ratio, sensor 6b in the above-mentioned FIG. 1 as an example.

In the control shown in FIG. 5, from a time point t0 to a time point t11, the internal combustion engine 1 performs normal operation (at this time, the fuel cut processing and the fuel supply processing are not carried out). Then, when the fuel supply processing execution flag changes from 0 to 1 at the time point t11 and the ECU 20 carries out fuel supply processing, the air fuel ratio of the exhaust gas in the exhaust passage 5 at the downstream side of the fuel addition valve 9 changes to a richer side than before. As a result, the output value of the air fuel ratio sensor begins to decrease from C0. In particular, in the second air fuel ratio sensor 6b arranged in the exhaust passage 5 at the downstream side of the oxidation catalyst 51, oxygen is consumed with the oxidation of fuel in the oxidation catalyst 51, and hence, the output value of the air fuel ratio sensor easily changes to a relatively large extent. Here, the fuel supply processing is intermittently carried out at a predetermined period or interval. Accordingly, the ECU 20 once stops the addition of fuel from the fuel addition valve 9, after carrying out the addition of fuel for a certain period of time from the time point t11. Then, once the addition of fuel is stopped, the output value of the air fuel ratio sensor, which is decreasing from C0, changes to increasing. In addition, in the control shown in FIG. 5, at the time point t1 after the time point t11, the fuel cut processing execution flag changes from 0 to 1, and the fuel cut processing is carried out, so in this increase in the output value of the air fuel ratio sensor, the output value of the air fuel ratio sensor becomes larger than C0.

Then, when the fuel cut processing is carried out, the output value of the air fuel ratio sensor increases from C0 in this manner, but at the timing at which the next addition of fuel in this process of increasing is carried out, the output value of the air fuel ratio sensor temporarily decreases from before. In other words, the output value of the air fuel ratio sensor increases, while varying according to the fuel supply processing intermittently carried out at the predetermined period. Moreover, if the fuel supply processing is continued after the time point t4 (reference timing) at which the output value of the air fuel ratio sensor represented by the line L2 in FIG. 5 converges, the output value of the air fuel ratio sensor continues to vary according to the fuel supply processing. Here, note that even if the fuel supply processing is carried out with the fuel cut processing, the change of the air fuel ratio (oxygen concentration) of the exhaust gas accompanying the execution of the fuel cut processing is assumed to have converged at the reference timing. In other words, when the fuel supply processing is carried out with the fuel cut processing, the change of the air fuel ratio (oxygen concentration) of the exhaust gas accompanying the execution of the fuel cut processing has converged at the reference timing, but the air fuel ratio (oxygen concentration) of the exhaust gas actually passing through the air fuel ratio sensor at that time is varied according to the execution of the fuel supply processing, and as a result, the output value of the air fuel ratio sensor in the measurement period will vary in a periodic manner, as shown by the line L1 in FIG. 5.

Here, note that in FIG. 5, there has been explained a case where the output of the second air fuel ratio sensor 6b in the above-mentioned FIG. 1 is used as the output value of the air fuel ratio sensor, but the situation as mentioned above where it becomes difficult to calculate the response index value is not limited to the case of using the output of the second air fuel ratio sensor 6b, but occurs similarly in cases where the output of the first air fuel ratio sensor 6a or the third air fuel ratio sensor 6c is used. In addition, the measurement period in this embodiment is defined as follows. That is, by using as the reference timing the timing (time point t4) at which the output value of the air fuel ratio sensor converges, the measurement period is set as a period of time from the reference timing until a predetermined period of time ΔT elapses. However, the measurement period of the present disclosure may also be defined as follows. That is, by using, as the reference timing, a predetermined timing after the timing at which the output value of the air fuel ratio sensor converges, the measurement period may be set as a period of time from the reference timing until the predetermined period of time ΔT elapses.

Here, when the output value of the air fuel ratio sensor varies in the measurement period, as shown by the line L1 in FIG. 5, it is considered to calculate the response index value by using an average (or a mean) value of the output value of the air fuel ratio sensor in the measurement period as the above-mentioned diagnostic output value. However, in the present disclosure, it has been found that when the fuel supply processing is carried out in the measurement period, it is possible to diagnose the air fuel ratio sensor with high accuracy as much as possible, while maintaining the function of the exhaust system of the internal combustion engine 1, by calculating the response index value by using, as the diagnostic output value, a first output value which is an output value at the leanest side in the output value of the air fuel ratio sensor in the measurement period, rather than by calculating the response index value by using the mean value as the diagnostic output value. This will be explained below based on FIG. 6A and FIG. 6B.

FIG. 6A and FIG. 6B are each a time chart showing the change over time of the output value of the air fuel ratio sensor shown in the above-mentioned FIG. 5. Here, in FIG. 6A, the mean value of the output value of the air fuel ratio sensor in the measurement period is represented by Cave, and in FIG. 6B, the first output value, which is an output value at the leanest side in the output value of the air fuel ratio sensor in the measurement period, is represented by Crt1. In addition, in FIG. 6A and FIG. 6B, the converged value of the output value of the air fuel ratio sensor at the reference timing in the case where only the fuel cut processing is carried out (this being represented by the line L2) is represented by C1. This value C1 is an output value of the air fuel ratio sensor corresponding to the oxygen concentration of the exhaust gas (a predetermined oxygen concentration in the present disclosure) which has become comparable to that of the atmosphere by means of the fuel cut processing, and is hereinafter referred to as the "reference output value". In that case, in FIG. 6A, a difference between the mean value Cave and the reference output value C1 becomes ΔCa. On the other hand, in FIG. 6B, a difference between the first output value Crt1 and the reference output value C1 becomes ΔCb. Then, when ΔCa is compared with ΔCb, ΔCa is larger than ΔCb. That is, the mean value Cave becomes a value which is deviated from the reference output value C1 in comparison with a second output value Crt2.

Then, when the response index value is calculated by using the mean value Cave as the diagnostic output value and the response of the air fuel ratio sensor is diagnosed based on the response index value thus calculated, there is a fear that the diagnostic accuracy may decrease. This is because when the air fuel ratio sensor is diagnosed by using the reference output value C1 as the diagnostic output value, the influence of the change of the output gain of the sensor with respect to the diagnosis may be eliminated as correctly as possible, but the mean value Cave is a value deviated from the reference output value C1, and so when the air fuel ratio sensor is diagnosed by using the mean value Cave as the diagnostic output value, it becomes difficult to eliminate the influence of the change of the output gain of the sensor with respect to the diagnosis. In contrast to this, the first output value Crt1 becomes a value closer to the reference output value C1 than the mean value Cave, and hence, when the response index value is calculated by using the first output value Crt1 as the diagnostic output value, the influence in the case of changing of the output gain of the air fuel ratio sensor in the diagnosis of the response of the air fuel ratio sensor can be eliminated as much as possible.

Thus, in this embodiment, when the fuel supply processing is carried out in the measurement period, the response index value is calculated by using the first output value as the diagnostic output value. With this, even when the fuel supply processing is carried out in the measurement period, the response of the air fuel ratio sensor can be diagnosed with high accuracy as much as possible. In addition, when the fuel supply processing is stopped in the measurement period, the SCR catalyst temperature will drop, thereby giving rise to a fear that exhaust emissions may deteriorate. In contrast to this, in this embodiment, the fuel supply processing is carried out in the measurement period, so the function of the SCR catalyst 52 is maintained. As a result of this, the deterioration of exhaust emissions is suppressed. As described above, the diagnostic apparatus for an exhaust gas sensor according to the present disclosure makes it possible to diagnose the exhaust gas sensor with high accuracy as much as possible, while maintaining the function of the exhaust system of the internal combustion engine 1.

(Response Diagnosis Flow)

Next, a control flow executed by the ECU 20, which is the diagnostic apparatus for an exhaust gas sensor according to the present disclosure, will be explained based on FIG. 7. FIG. 7 is a flow chart showing the control flow according to this embodiment. In this embodiment, this flow or routine is carried out by the ECU at a predetermined operation interval in a repeated manner during the execution of the fuel supply processing. In this embodiment, this flow is carried out at the predetermined interval of execution, and the predetermined interval of execution is defined as a period of time $\Delta$ta. Here, note that in the explanation of this flow, the first air fuel ratio sensor 6a, the second air fuel ratio sensor 6b and the third air fuel ratio sensor 6c are each simply referred to as an "air fuel ratio sensor".

In this flow or routine, first, in step S101, it is determined whether there is any execution request for the diagnosis of the response of an air fuel ratio sensor. In step S101, an affirmative determination is made, for example, when a vehicle with the internal combustion engine 1 mounted thereon has traveled a predetermined distance, or when the internal combustion engine 1 has operated for a certain period of time, or when the internal combustion engine 1 is stopped and is thereafter restarted, etc., after the response of the air fuel ratio sensor was diagnosed last time. Here, note that the above is some examples, and in step S101, it can be determined based on well-known techniques whether there is any execution request for the diagnosis of the response of the air fuel ratio sensor. Then, if an affirmative determination is made in step S101, the routine of the ECU 20 goes to the processing of step S102, whereas if a negative determination is made in step S101, the execution of this routine is terminated.

If an affirmative determination is made in step S101, then in step S102, it is determined whether the fuel cut processing is being carried out. When the fuel cut processing is carried out, the air fuel ratio (oxygen concentration) of the exhaust gas rises, and the air fuel ratio (oxygen concentration) is converged to a predetermined value, so it becomes possible to calculate the response index value Valin to be described later. Then, if an affirmative determination is made in step S102, the ECU 20 goes to the processing of step S103, whereas if a negative determination is made in step S102, the ECU 20 goes to the processing of step S121.

If an affirmative determination is made in step S102, then in step S103, a convergence determination flag nflag, which determines the convergence of the output value of the air fuel ratio sensor, is read in. The convergence determination flag nflag is a flag which is set to 1 in cases where it is estimated that the output value of the air fuel ratio sensor varying with the fuel cut processing is converged, and the value of this flag is set according to a well-known flow different from this flow, and is stored in a ROM of the ECU 20. In step S103, the convergence determination flag nflag stored in the ROM of the ECU 20 is read in. The convergence determination flag nflag is, for example, set as follows. First, an integrated value of an amount of air having passed through the interior of the cylinder after starting the execution of the fuel cut processing is calculated. Then, when the integrated value becomes equal to or more than a predetermined threshold value, it is determined that scavenging in the cylinder has been completed. Then, a period of time elapsed after the completion of the scavenging in the cylinder is counted, and when the elapsed period of time becomes equal to or more than a predetermined determination period of time, the convergence determination flag nflag is set to 1. On the other hand, if the scavenging in the cylinder is not completed, or if the elapsed period of time is less than the predetermined determination period of time, the convergence determination flag nflag is set to 0. Here, it can be said that for the convergence determination flag nflag set in this manner, its value is set to 0 in a period of time from the start of the execution of the fuel cut processing before the above-mentioned reference timing is reached, whereas it is set to 1 at the reference timing.

Subsequently, in step S104, it is determined whether the convergence determination flag nflag read in step S103 is 0. In cases where an affirmative determination is made in step S104, this is a case where it is estimated that the change of the air fuel ratio of the exhaust gas with the execution of the fuel cut processing has not yet converged, and in this case, the routine of the ECU 20 goes to the processing of step S105. On the other hand, in cases where a negative determination is made in step S104, this is a case where it is estimated that the change of the air fuel ratio of the exhaust gas with the execution of the fuel cut processing has converged, and in this case, the routine of the ECU 20 goes to the processing of step S111.

If an affirmative determination is made in step S104, then in step S105, a present value Crtnow of the output value of the air fuel ratio sensor (hereinafter, sometimes referred to as an "output present value") is obtained. In step S105, a present value of the limiting current value corresponding to the air fuel ratio of the exhaust gas, which reaches the sensor body 100 of the air fuel ratio sensor, is obtained as the output present value Crtnow.

Then, in step S106, a present value Rcnow of the absolute rate of change is calculated. In step S106, the present value Rcnow of the absolute rate of change is calculated by dividing an absolute value of a value, which is obtained by subtracting a past value (hereinafter, referred to as an "output past value") Crtold of the output value of the air fuel ratio sensor from the output present value Crtnow obtained in step S105, by the period of time $\Delta$ta. Here, the output past value Crtold is updated by the processing of step S110 to be described later, or is initialized by the processings of steps S120, S121 to be described later, and is stored in the ROM of the ECU 20.

Subsequently, in step S107, it is determined whether the present value Rcnow of the absolute rate of change calculated in step S106 is larger than a maximum value Rcmax of the absolute rate of change. Here, the maximum value Rcmax of the absolute rate of change is updated by the processing of step S108 to be described later, or is initialized by the processings of steps S120, S121 to be described later, and is stored in the ROM of the ECU 20. Then, if an affirmative determination is made in step S107, the routine of the ECU 20 goes to the processing of step S108, whereas if a negative determination is made in step S107, the routine of the ECU 20 goes to the processing of step S110.

If an affirmative determination is made in step S107, then in step S108, the maximum value Rcmax of the absolute rate of change is updated. In step S108, the maximum value Rcmax of the absolute rate of change is updated to the present value Rcnow of the absolute rate of change calculated in step S106. Subsequently, in step S109, an output value Crtrcm of the air fuel ratio sensor at the time when the absolute rate of change becomes the maximum value (hereinafter, sometimes referred to as an "output value at the time of the maximum absolute rate of change") is obtained. In step S109, the output present value Crtnow at this time is obtained as the output value Crtrcm at the time of the maximum absolute rate of change.

Thereafter, in step S110, the output past value Crtold is updated. In step S110, the output past value Crtold is updated to the output present value Crtnow obtained in step S105.

In addition, if a negative determination is made in step S104, then in step S111, the output present value Crtnow is obtained. This processing of step S111 is substantially the same as the above-mentioned processing of step S105. Here, as mentioned above, in cases where a negative determination is made in step S104, this is a case where it is estimated that the change of the air fuel ratio of the exhaust gas with the execution of the fuel cut processing has converged. In other words, this is timing after the reference timing has been reached after the start of the execution of the fuel cut processing. Then, the processings of steps S111 to S120 are carried out in the above-mentioned measurement period.

Subsequently, in S112, it is determined whether an absolute value of the output present value Crtnow obtained in step S111 is larger than an absolute value of the first output value Crt1 which is an output value at the leanest side in the output value of the air fuel ratio sensor in the measurement period. Here, the first output value Crt1 is updated by the processing of step S113 to be described later, or is initialized by the processings of steps S120, S121 to be described later, and is stored in the ROM of the ECU 20. Then, if an affirmative determination is made in step S112, the routine of the ECU 20 goes to the processing of step S113, whereas if a negative determination is made in step S112, the routine of the ECU 20 goes to the processing of step S114.

If an affirmative determination is made in step S112, then in step S113, the first output value Crt1 is updated. In step S113, the first output value Crt1 is updated to the output present value Crtnow obtained in step S111.

Thereafter, in step S114, 1 is added to a measurement counter Num which is a counter with respect to the measurement period. Then, in step S115, it is determined whether the value of the measurement counter Num becomes the measurement threshold value Numth which is a threshold value with respect to the measurement period. Then, in cases where an affirmative determination is made in step S115, this is timing at which a predetermined period of time elapses from the reference timing (this predetermined period of time being LT shown in the above-mentioned FIG. 4 to FIG. 6B, for example), and at which the measurement period terminates, and the routine of the ECU 20 goes to the processing of step S116. On the other hand, in cases where a negative determination is made in step S115, the measurement period still continues in this case, and the present execution of this flow or routine is ended.

If an affirmative determination is made in step S115, then in step S116, the above-mentioned diagnostic output value Crtdg is set as the first output value Crt1. Then, in step S117, a difference Crtdif between this diagnostic output value Crtdg and the output value Crtrcm at the time of the maximum absolute rate of change obtained in step S109 is calculated.

Then, in step S118, the response index value Valin is calculated. In step S118, the response index value Valin is calculated by dividing the maximum value Rcmax of the absolute rate of change (this representing the maximum absolute rate of change.) by the difference Crtdif calculated in step S117. Thereafter, in step S119, the response of the air fuel ratio sensor is diagnosed based on this response index value Valin. In step S119, as the diagnosis of the response of the air fuel ratio sensor, for example, the response of the air fuel ratio sensor can be estimated such that the response of the air fuel ratio sensor becomes higher when the response index value Valin is large than when it is small. In addition, for example, based on the response index value Valin, abnormality in the response of the air fuel ratio sensor can be diagnosed. In this case, for example, when the response index value Valin is equal to or more than a predetermined determination threshold value, a determination can be made that the response of the air fuel ratio sensor is normal, whereas when the response index value Valin is less than the predetermined determination threshold value, a determination can be made that an abnormality has occurred in the response of the air fuel ratio sensor. Here, note that the ECU 20 functions as a controller according to the present disclosure by calculating the response index value Valin and diagnosing the response of the air fuel ratio sensor.

Subsequently, in step S120, the output past value Crtold, the maximum value Rcmax of the absolute rate of change, the first output value Crt1, and the measurement counter Num are initialized. In step S120, the output past value Crtold is initialized to a limiting current value corresponding to the air fuel ratio of the exhaust gas at the time of normal operation of the internal combustion engine 1 (i.e., when the fuel cut processing and the fuel supply processing are not carried out). In addition, the maximum value Rcmax of the absolute rate of change, the first output value Crt1, and the measurement counter Num are initialized to 0. Then, after the processing of step S120, the execution of this flow or routine is ended.

In addition, if a negative determination is made in step S102, then in step S121, the output past value Crtold, the maximum value Rcmax of the absolute rate of change, the first output value Crt1, and the measurement counter Num are initialized. As a result of this, these values will be initialized, even if the fuel cut processing is terminated before the diagnosis of the response of the air fuel ratio sensor according to this flow is completed. This processing of step S121 is substantially the same as the above-mentioned processing of step S120. Then, after the processing of step S121, the execution of this flow or routine is ended.

The diagnostic apparatus for an exhaust gas sensor according to the present disclosure makes it possible to diagnose the response of the air fuel ratio sensor with high accuracy while maintaining the function of the exhaust system of the internal combustion engine 1, by calculating the response index value Valin, and diagnosing the response of the air fuel ratio sensor based on the response index value Valin thus obtained, as stated above.

Here, note that the explanation described above is about the control flow which is executed by the ECU 20 when the fuel supply processing is carried out, as mentioned above. On the other hand, when the fuel supply processing is not carried out, the flow or routine for diagnosing the response of the air fuel ratio sensor is carried out by using as the diagnostic output value Crtdg the second output value Crt2 which is an average or mean value of the output value of the air fuel ratio sensor in the measurement period. In this case, the second output value Crt2 can be calculated, instead of using the processings of steps S112, S113 shown in the above-mentioned FIG. 7, by integrating the output present value Crtnow obtained in step S111 during the measurement period, and then dividing the integrated value thus obtained by the number of times of integration (integration frequency). Then, instead of the processing of step S116 shown in the above-mentioned FIG. 7, the second output value Crt2 can be set as the diagnostic output value Crtdg.

First Modification of the First Embodiment

Now, reference will be made to a first modification of the above-mentioned first embodiment. Here, note that in this modification, the detailed explanation of substantially the same construction and substantially the same control processing as in the first embodiment will be omitted.

In the first embodiment, the ECU 20 serves to raise the oxygen concentration of the exhaust gas by carrying out the fuel cut processing. In contrast to this, in this modification, the ECU 20 functions to raise the oxygen concentration of the exhaust gas to or above the predetermined oxygen concentration, and to form, for predetermined period of time or longer, a state where the oxygen concentration of the exhaust gas becomes the predetermined oxygen concentration, by carrying out predetermined air fuel ratio control to raise the oxygen concentration (air fuel ratio) of the exhaust gas, in order to diagnose the response of the air fuel ratio sensor. In this air fuel ratio control, an air fuel ratio, which is richer than a stoichiometric air fuel ratio, is raised to a leaner air fuel ratio than the stoichiometric air fuel ratio, for example. Here, note that this air fuel ratio control is processing which is different from the fuel supply processing. In addition, in this modification, the air fuel ratio control corresponds to predetermined oxygen concentration processing in the present disclosure, and the ECU 20 functions as the controller according to the present disclosure, by carrying out the air fuel ratio control.

Here, differences in processing between a control flow or routine in this modification and that in the flow chart shown in the above-mentioned FIG. 7 will be explained. With the control flow in this modification, if an affirmative determination is made in step S101, then, instead of the processing of step S102, it is determined whether the air fuel ratio control is being carried out. Then, if a determination is made that the air fuel ratio control is being carried out, the ECU 20 goes to the processing of step S103, whereas if the air fuel ratio control is not being carried out, the ECU 20 goes to the processing of step S121.

By means of the air fuel ratio control in this modification, too, the output value of the air fuel ratio sensor will be changed with the rising of the air fuel ratio (oxygen concentration) of the exhaust gas, so it becomes possible to calculate the response index value Valin. Accordingly, by diagnosing the response of the air fuel ratio sensor based on the response index value Valin, the response of the air fuel ratio sensor can be diagnosed with accuracy, while maintaining the function of the exhaust system of the internal combustion engine 1.

Second Modification of the First Embodiment

Next, reference will be made to a second modification of the above-mentioned first embodiment of the present disclosure based on FIG. 8. FIG. 8 is a flow chart showing a control flow according to this second modification. As mentioned above, the flow chart shown in FIG. 7 of the first embodiment represents the control flow or routine, carried out by the ECU 20 during the execution of the fuel supply processing. On the other hand, in actuality, there is a case where in the measurement period, there exist a time period in which the fuel supply processing is carried out, and a time period in which the fuel supply processing is not carried out. Accordingly, in this second modification, the control flow or routine shown in FIG. 8 is carried out by the ECU 20 at a predetermined operation interval in a repeated manner during the operation of the internal combustion engine 1. In this second modification, this flow or routine is carried out at a predetermined interval of execution, and the predetermined interval of execution is defined as a period of time Δta, as described in the above-mentioned explanation of FIG. 7. Here, note that in respective processings shown in FIG. 8, the same reference signs are attached to the substantially same processings as those shown in the above-mentioned FIG. 7, and the detailed explanation thereof is omitted. In addition, in this second modification, the detailed explanation of substantially the same construction as in the first embodiment will be omitted.

In the control flow or routine shown in FIG. 8, after the processing of step S111, it is determined in step S201 whether fuel supply processing is being carried out. Here, note that the fuel supply processing is as described in the explanation thereof in the first embodiment. Then, if an affirmative determination is made in step S201, the routine of the ECU 20 goes to the processing of step S212, whereas if a negative determination is made in step S201, the routine of the ECU 20 goes to the processing of step S203.

If an affirmative determination is made in step S201, then in step S212, it is determined whether an absolute value of the output present value Crtnow obtained in step S111 is larger than an absolute value of a third output value Crt3 which is an output value at the leanest side in the output value of the air fuel ratio sensor at the time when the fuel supply processing is carried out in the measurement period. Here, the third output value Crt3 is updated by the processing of step S213 to be described later, or is initialized by the processings of steps S220, S221 to be described later, and is stored in the ROM of the ECU 20. Then, if an affirmative determination is made in step S212, the routine of the ECU 20 goes to the processing of step S213, whereas if a negative determination is made in step S212, the routine of the ECU 20 goes to the processing of step S202.

If an affirmative determination is made in step S212, then in step S213, the third output value Crt3 is updated. In step S213, the third output value Crt3 is updated to the output present value Crtnow obtained in step S111. Then, in step S202, 1 is added to a first counter n which is a counter with respect to a time period in which the fuel supply processing in the measurement period is carried out.

On the other hand, if a negative determination is made in step S201, then in S203, an integrated value Crtsum of the output value of the air fuel ratio sensor at the time when the fuel supply processing is not carried out in the measurement period (hereinafter, sometimes simply referred to as an "integrated value") is calculated. In step S203, the integrated value Crtsum is also calculated by integrating the output present Crtnow obtained in step S111. Then, in step S204, 1 is added to a second counter m which is a counter indicating the number of times of integration (integration frequency) of the integrated value Crtsum. Thereafter, in step S205, a fourth output value Crt4, which is an average or mean value of the output value of the air fuel ratio sensor at the time when the fuel supply processing is not carried out in the measurement period, is calculated. In step S205, the fourth output value Crt4 is calculated by dividing the integrated value Crtsum calculated in step S203 by the value of the second counter m.

After the third output value Crt3 or the fourth output value Crt4 is calculated in this manner, then in step S214, the measurement counter Num is calculated. In step S214, the measurement counter Num is calculated by adding the value of the first counter n and the value of the second counter m together. Here, note that the measurement counter Num is a counter with respect to the measurement period, as described in the above-mentioned explanation of FIG. 7. Then, after the processing of step S214, the routine of the ECU 20 goes to the processing of step S115.

Thereafter, in the control flow shown in FIG. 8, if an affirmative determination is made in step S115, then in step S216, the diagnostic output value Crtdg is set. In step S216, the leaner side one of the third output value Crt3 and the fourth output value Crt4 is set as the diagnostic output value Crtdg. Then, after the processing of step S216, the routine of the ECU 20 goes to the processing of step S117 onward, and in step S119, the response of the air fuel ratio sensor is diagnosed based on the response index value Valin, as in the first embodiment. Here, in this second modification, the diagnosis of the air fuel ratio sensor is made by setting the leaner side one of the third output value Crt3 and the fourth output value Crt4 as the diagnostic output value Crtdg, as a result of which the air fuel ratio sensor can be diagnosed based on the value which becomes relatively close to the reference output value (this reference output value being C1 which is shown in the above-mentioned FIG. 4 to FIG. 6B, for example) in the output value of the air fuel ratio sensor in the measurement period.

In addition, in the control flow shown in FIG. 8 in step S220 after the processing of step S119, or in step S221 in the case of a negative determination made in step S102, the output past value Crtold, the maximum value Rcmax of the absolute rate of change, the integrated value Crtsum, the third output value Crt3, the fourth output value Crt4, the first counter n, the second counter m, and the measurement counter Num are initialized. Here, the output past value Crtold, the maximum value Rcmax of the absolute rate of change, and the measurement counter Num are initialized, as described in the above-mentioned explanation of FIG. 7. Moreover, the integrated value Crtsum, the third output value Crt3, the fourth output value Crt4, the first counter n, and the second counter m are initialized to 0. Then, after the processing of step S220, or after the processing of step S221, the execution of this flow is ended.

According to the control flow described above, too, it is possible to diagnose the response of the air fuel ratio sensor with high accuracy while maintaining the function of the exhaust system of the internal combustion engine 1.

Third Modification of the First Embodiment

Next, reference will be made to a third modification of the above-mentioned first embodiment of the present disclosure based on FIG. 9 and FIG. 10. FIG. 9 is a flow chart showing a control flow or routine according to this third modification. In this third modification, this flow or routine is carried out by the ECU 20, as described in the explanation of FIG. 8 in the second modification of the first embodiment. Here, note that in respective processings shown in FIG. 9, the same reference signs are attached to the substantially same processings as those shown in the above-mentioned FIG. 8, and the detailed explanation thereof is omitted. In addition, in this third modification, the detailed explanation of substantially the same construction as in the first embodiment will be omitted.

Here, when a time period in which the fuel supply processing is not carried out in the measurement period (hereinafter, sometimes referred to as a "non-execution period") has a certain amount of length, the above-mentioned fourth output value Crt4 is apt to become relatively close to the above-mentioned reference output value. Accordingly, it is considered that priority is given to the fourth output value Crt4 over the above-mentioned third output value Crt3. However, in this case, the non-execution period becomes shorter than the measurement period, so even if the exhaust gas sensor output value is averaged, the influence of sensor errors such as output variation, etc., may not be able to be eliminated to a sufficient extent.

Accordingly, in the control flow shown in FIG. 9, the air fuel ratio sensor is diagnosed based on the diagnostic output value Crtdg and the length of the non-execution period, by setting, in principle, the fourth output value Crt4 to the diagnostic output value Crtdg. Specifically, in cases where it is determined, based on a comparison between the response index value and the determination threshold value, whether an abnormality has occurred in the response of the air fuel ratio sensor, the determination threshold value is changed based on the length of the non-execution period. For details, in the control flow shown in FIG. 9, the non-execution period Tnonexe is calculated in step S301 after the processing of step S205. In step S301, the non-execution period Tnonexe is calculated based on the value of the second counter m, and the period of time Ota which is an interval of execution of this flow. Then, after the processing of step S301, the routine of the ECU 20 goes to the processing of step S214.

In addition, in the control flow or routine shown in FIG. 9, if an affirmative determination is made in step S115, then in step S315, it is determined whether the fourth output value Crt4 becomes 0. As mentioned above, in this third modification, the fourth output value Crt4 is, in principle, set to the diagnostic output value Crtdg. However, when the value of the fourth output value Crt4 has not been updated after the fourth output value Crt4 was initialized, the value of the fourth output value Crt4 remains 0 as it was. In this case, when the fourth output value Crt4 is used, the response index value Valin can not be calculated in an accurate manner. Accordingly, if an affirmative determination is made in step S315, the routine of ECU 20 goes to the processing of step S316, and in step S316, the diagnostic output value Crtdg is set as the fourth output value Crt4. On the other hand, if a negative determination is made in step S315, the routine of ECU 20 goes to the processing of step S317, and in step S317, the diagnostic output value Crtdg is set as the third output value Crt3. Then, after the processing of step S316 or the processing of step S317, the routine of the ECU 20 goes to the processing of step S117 onward.

Then, in step S302 after the processing of step S118, it is determined whether the response index value Valin calculated in step S118 becomes equal to or more than a determination threshold value Vth. This determination threshold value Vth is a threshold value for determining whether an abnormality has occurred in the response of the air fuel ratio sensor, and when the response index value Valin becomes less than the determination threshold value Vth, a determination can be made that an abnormality has occurred in the response of the air fuel ratio sensor.

Here, in this third modification, the determination threshold value Vth is decided based on the non-execution period Tnonexe calculated in step S301. FIG. 10 is a graph showing a correlation between the non-execution period Tnonexe and the determination threshold value Vth. For example, the determination threshold value Vth is set in such a manner that the shorter the non-execution period Tnonexe, the smaller the determination threshold value Vth becomes, as shown in FIG. 10. In this case, the determination threshold value Vth is made smaller when the length of the non-execution period Tnonexe is short than when it is long, stated in another way, smaller when it is easy to be affected by the influence of sensor errors than when it is hard to be affected thereby, as a result of which occurrence of a situation is suppressed where it is determined that an abnormality has occurred in the response of the air fuel ratio sensor under the influence of sensor errors. Thus, in this third modification, the abnormality in the response of the air fuel ratio sensor can be diagnosed in consideration of the influence of sensor errors which can change according to the length of the non-execution period Tnonexe. Then, if an affirmative determination is made in step S302, the routine of the ECU goes to the processing of step S303, whereas if a negative determination is made in step S302, the routine of the ECU 20 goes to the processing of step S304.

If an affirmative determination is made in step S302, then in step S303, a determination is made that the response of the air fuel ratio sensor is normal (normal determination). On the other hand, if a negative determination is made in step S302, then in step S304, a determination is made that an abnormality has occurred in the response of the air fuel ratio sensor (abnormal determination). Then, in step S320 after the processing of step S303 or S304, the output past value Crtold, the maximum value Rcmax of the absolute rate of change, the integrated value Crtsum, the third output value Crt3, the fourth output value Crt4, the first counter n, the second counter m, and the measurement counter Num are initialized. These are initialized as described in the above-mentioned explanation of FIG. 8. In addition, if a negative determination is made in step S102, then in step S321, similarly, the output past value Crtold, the maximum value Rcmax of the absolute rate of change, the integrated value Crtsum, the third output value Crt3, the fourth output value Crt4, the first counter n, the second counter m, and the measurement counter Num are initialized. Then, after the processing of step S320, or after the processing of step S321, the execution of this flow is ended.

According to the control flow described above, too, it is possible to diagnose the abnormality in the response of the air fuel ratio sensor with high accuracy while maintaining the function of the exhaust system of the internal combustion engine 1. Here, note that in this third modification, the response index value Valin may be corrected according to the length of the non-execution period.

Fourth Modification of the First Embodiment

Next, reference will be made to a fourth modification of the above-mentioned first embodiment of the present disclosure based on FIG. 11A, FIG. 11B and FIG. 12. Here, note that in this fourth modification, the detailed explanation of substantially the same construction and substantially the same control processing as in the above-mentioned first embodiment will be omitted.

In this fourth modification, when there is an execution request with respect to the diagnosis of the response of the air fuel ratio sensor, the amount of addition of fuel to be added at one time and the time period or interval of the addition of fuel in the fuel supply processing are changed with respect to when there is no such execution request. This will be explained below in detail.

FIG. 11A is a diagram for explaining the fuel supply processing carried out when there is no execution request with respect to the diagnosis of the response of the air fuel ratio sensor. On the other hand, FIG. 11B is a diagram for explaining the fuel supply processing carried out when there is an execution request with respect to the diagnosis of the response of the air fuel ratio sensor, in this fourth modification of the first embodiment. Then, in each of FIG. 11A and FIG. 11B, there are shown the changes over time of a fuel supply processing execution flag, a fuel cut processing execution flag, the flow rate of fuel added from the fuel addition valve 9, and the output value of the air fuel ratio sensor. Here, note that in the changes over time of the output value of the air fuel ratio sensor in FIG. 11A, a line L3 represented by a solid line shows the change over time in the case where the fuel supply processing is carried out when there is no above-mentioned execution request, and in the changes over time of the output value of the air fuel ratio sensor in FIG. 11B, a line L4 represented by a solid line shows the change over time in the case where the fuel supply processing is carried out when there is the above-mentioned execution request in this fourth modification. In addition, in each of FIG. 11A and FIG. 11B, a broken line L2 shows as reference the change over time in the case where the fuel supply processing is not carried out (i.e., the same as in the case of the change over time of the output value of the air fuel ratio sensor shown in the above-mentioned FIG. 4). Here, note that the output value of the air fuel ratio sensor represents the output of the second air fuel ratio sensor 6b in the above-mentioned FIG. 1 as an example.

In FIG. 11A, when the fuel supply processing execution flag is changed from 0 to 1 at a time point t11, the fuel supply processing is started. Specifically, at the time point t11, the addition of fuel from the fuel addition valve 9 is started. This addition of fuel is carried out for a period of time Δt0, with the flow rate of fuel being set to be a first flow rate FR1. As a result, the amount of addition of fuel to be added at one time becomes a first predetermined amount Q1 (i.e., this being represented by an area of a hatched region in FIG. 11A). Then, the fuel supply processing is achieved by such an addition of fuel being carried out at the first predetermined period or interval Δt1: Here, the first predetermined amount Q1 and the first predetermined period Δt1 are an amount of supply of fuel to be supplied at one time and a period or interval of the addition of fuel, respectively, which are set in normal time (e.g., set in such a manner that exhaust emissions can be suppressed as much as possible). Then, when fuel is added in a repeated manner at the first predetermined period Δt1 by setting the amount of supply of fuel to be supplied at one time to the first predetermined amount Q1, the air fuel ratio of the exhaust gas becomes easy to vary to a relatively large extent.

On the other hand, in FIG. 11B, the addition of fuel from the fuel addition valve 9 is carried out for the period of time Δt0, with the flow rate of fuel being set to be a second flow rate FR2 which is smaller than the first flow rate FR1. As a result, the amount of addition of fuel to be added at one time becomes a second predetermined amount Q2 (i.e., this being represented by an area of hatched region in FIG. 11B). This second predetermined amount Q2 is smaller than the first predetermined amount Q1. Then, the fuel supply processing according to this fourth modification is achieved by such an addition of fuel being carried out at a second predetermined period Δt2 which is longer than the first predetermined period Δt1. In this case, the width of variation of the air fuel ratio of the exhaust gas in the measurement period is made smaller, and the period or interval of the variation thereof becomes longer, in comparison with the case where the fuel supply processing shown in FIG. 11A is carried out. As a result of this, it is possible to diagnose the response of the air fuel ratio sensor with higher accuracy. This will be explained below based on FIG. 12.

FIG. 12 is a time chart showing the line L3 in FIG. 11A, and the line L4 in FIG. 11B together in the changes over time of the output value of the air fuel ratio sensor, in order to make a comparison between the above-mentioned fuel supply processing shown in FIG. 11A and the above-mentioned fuel supply processing shown in FIG. 11B. Here, note that in FIG. 12, the above-mentioned line L3 shown in FIG. 11A is represented by an alternate long and short dash line, and the above-mentioned line L4 shown in FIG. 11B is represented by a solid line.

Then, in FIG. 12, in the output of the air fuel ratio sensor in the measurement period, an output value at the leanest side is represented by a first output value, wherein the first output value with respect to the line L3 is shown as Crt13, and the first output value with respect to the line L4 is shown as Crt14. Here, when a comparison is made between Crt13 and Crt14, Crt14 becomes a value closer to the reference output value C1 than Crt13. For that reason, when the response index value is calculated by using the first output value Crt14 as the diagnostic output value, the influence in the case of changing of the output gain of the air fuel ratio sensor in the diagnosis of the response of the air fuel ratio sensor can be eliminated as much as possible. In other words, by means of the fuel supply processing according to this fourth modification, it becomes possible to eliminate the influence in the case of changing of the output gain of the air fuel ratio sensor in the diagnosis of the response of the air fuel ratio sensor as much as possible.

According to this fourth modification, even when the fuel supply processing is carried out in the measurement period, the response of the air fuel ratio sensor can be diagnosed with higher accuracy. In other words, it is possible to diagnose the response of the air fuel ratio sensor with higher accuracy while maintaining the function of the exhaust system of the internal combustion engine 1.

Fifth Modification of the First Embodiment

Next, reference will be made to a fifth modification of the above-mentioned first embodiment. Here, note that in this fifth modification, the detailed explanation of substantially the same construction and substantially the same control processing as in the above-mentioned first embodiment will be omitted.

In this fifth modification, in cases where the response of the third air fuel ratio sensor 6c is diagnosed when the fuel supply processing is carried out in the measurement period, the fuel supply processing is carried out by setting the amount of addition of fuel to be added at one time to the above-mentioned first predetermined amount Q1 and by adding fuel in a repeated manner at the above-mentioned first predetermined period Δt1. On the other hand, in cases where the response of the second air fuel ratio sensor 6b is diagnosed when the fuel supply processing is carried out in the measurement period, the fuel supply processing is carried out by setting the amount of addition of fuel to be added at one time to the above-mentioned second predetermined amount Q2 and by adding fuel in a repeated manner at the above-mentioned second predetermined period Δt2.

Here, the more away it is from the oxidation catalyst 51 to the downstream side, the smaller the variation of the air fuel ratio with the execution of the fuel supply processing tends to become. Accordingly, when the fuel supply processing is carried out in the measurement period, the variation of the air fuel ratio of the exhaust gas passing through the second air fuel ratio sensor 6b is apt to become larger than the variation of the air fuel ratio of the exhaust gas passing through the third air fuel ratio sensor 6c. Thus, as mentioned above, when the response of the second air fuel ratio sensor 6b is diagnosed, the fuel supply processing is carried out by setting the amount of addition of fuel to be added at one time to the above-mentioned second predetermined amount Q2 and by adding fuel in a repeated manner at the above-mentioned second predetermined period Δt2, whereby the variation of the air fuel ratio of the exhaust gas passing through the second air fuel ratio sensor 6b is made relatively small. According to this, it is possible to diagnose the response of the air fuel ratio sensor with high accuracy while maintaining the function of the exhaust system of the internal combustion engine 1.

Second Embodiment (General Configuration of Internal Combustion Engine and its Intake and Exhaust Systems)

Now, a second embodiment of the present disclosure will be described. FIG. 13 is a diagram showing the general configuration of an internal combustion engine and its intake and exhaust systems according to this second embodiment of the present disclosure. The internal combustion engine 1 shown in FIG. 13 is an internal combustion engine of compression ignition type (diesel engine), and is provided with a fuel injection valve 2 for injecting fuel into a cylinder. Here, note that in this second embodiment, the detailed explanation of substantially the same construction and substantially the same control processing as in the above-mentioned first embodiment will be omitted.

The internal combustion engine 1 is connected to an exhaust passage 5. In the exhaust passage 5, there are arranged a fuel addition valve 9, a first NOx sensor 60a, an NOx storage reduction catalyst 54 (hereinafter, sometimes also referred to as an NSR catalyst 54) and second NOx sensor 60b in the order according to the flow of exhaust gas. Here, the first NOx sensor 60a and the second NOx sensor 60b are each a sensor which outputs an output signal corresponding to the oxygen concentration of the exhaust gas, similar to the air fuel ratio sensor described in the explanation of the first embodiment, and the concentration of NOx in the exhaust gas is calculated based on an output value of the sensor output signal. Here, note that in this second embodiment, these NOx sensors each correspond to the at least one exhaust gas sensor in the present disclosure.

The NSR catalyst 54 chemically stores or physically adsorbs the nitrogen oxides (NOx) contained in exhaust gas when the air fuel ratio of the exhaust gas is high (i.e., higher than the stoichiometric air fuel ratio), whereas the NSR catalyst 54 releases the NOx stored or adsorbed therein when the air fuel ratio of the exhaust gas is low (i.e., lower than the stoichiometric air fuel ratio), and at the same time, promotes the reaction between the NOx thus released and reducing components (e.g., hydrocarbon (HC), carbon monoxide (C0), etc.) in the exhaust gas. Here, when the amount of NOx chemically stored in or physically adsorbed to the NSR catalyst 54 increases, the NOx storage capacity of the NSR catalyst 54 is saturated, thus giving rise to a fear that the amount of NOx discharged into the atmosphere may increase. Accordingly, in this second embodiment, in order to purge the NOx chemically stored in or physically adsorbed to the NSR catalyst 54, the ECU 20 adds fuel from the fuel addition valve 9 in a repeated manner at a predetermined period or interval. In other words, the fuel supply processing is carried out by the ECU 20.

Then, in this second embodiment, a response index value having a correlation with the response of the NOx sensor is calculated similarly to the first embodiment. Moreover, a first output value used for the calculation of the response index value is set in the same manner as in the first embodiment. According to this, it is possible to diagnose the response of the NOx sensor with high accuracy while maintaining the function of the exhaust system of the internal combustion engine 1.

Third Embodiment

Now, a third embodiment of the present disclosure will be described. In the above-mentioned first embodiment, the response of an air fuel ratio sensor is diagnosed based on a response index value. In contrast to this, in this third embodiment, the response of an air fuel ratio sensor is diagnosed based on a well-known response parameter, which is a parameter with respect to the response of an air fuel ratio sensor. Here, note that in this third embodiment, the detailed explanation of substantially the same construction and substantially the same control processing as in the above-mentioned first embodiment will be omitted.

Here, according to the techniques described in the prior art literatures, etc., a response parameter is corrected based on a converged value of an air fuel ratio sensor output during the execution of fuel cut processing. However, if the above-mentioned fuel supply processing is carried out with the execution of the fuel cut processing, it becomes difficult to calculate the above-mentioned converged value.

Therefore, in this third embodiment, the response parameter is corrected based on the diagnostic output value described in the explanation of the first embodiment, in place of the above-mentioned converged value. Then, the response of an air fuel ratio sensor is diagnosed based on the response parameter corrected in this manner. According to this, it is possible to diagnose the response of the air fuel ratio sensor with high accuracy while maintaining the function of the exhaust system of the internal combustion engine 1.

Fourth Embodiment

Now, a fourth embodiment of the present disclosure will be described. The above-mentioned first embodiment is an example in which the response of an air fuel ratio sensor is diagnosed, and for example, abnormality in the response of the air fuel ratio sensor is diagnosed, as mentioned above. In contrast to this, in this fourth embodiment, abnormality in the output of an air fuel ratio sensor is diagnosed. This output abnormality is a situation where an output gain of the sensor is decreased due to decrease in the porosity of the diffusion rate controlling layer 14, deterioration of an electrode (the exhaust side electrode 12 or the atmosphere side electrode 13), etc. Here, note that in this fourth embodiment, the detailed explanation of substantially the same construction and substantially the same control processing as in the above-mentioned first embodiment will be omitted.

In this fourth embodiment, the output abnormality of the air fuel ratio sensor is diagnosed by diagnosing the magnitude of a diagnostic output value. Here, a control flow or routine with respect to the diagnosis of the output abnormality of the air fuel ratio sensor will be explained based on FIG. 14. FIG. 14 is a flow chart showing the control flow or routine according to this fourth embodiment. In this fourth embodiment, this flow or routine is carried out by the ECU 20 at a predetermined operation interval in a repeated manner during the execution of fuel supply processing. Here, note that in respective processings shown in FIG. 14, the same reference signs are attached to the substantially same processings as those shown in the above-mentioned FIG. 7.

In this flow or routine, first, in step S401, it is determined whether there is any execution request for the diagnosis of the output abnormality of an air fuel ratio sensor. In step 401, after the output abnormality of the air fuel ratio sensor was diagnosed last time, for example, when a vehicle with the internal combustion engine 1 mounted thereon traveled a predetermined distance, or when the internal combustion engine 1 was operated for a certain period of time, or when the internal combustion engine 1 was stopped and thereafter restarted, etc., an affirmative determination is made. Here, note that the above is some examples, and in step S401, it can be determined based on well-known techniques whether there is any execution request for the diagnosis of the output abnormality of the air fuel ratio sensor. Then, if an affirmative determination is made in step S401, the routine of the ECU goes to the processing of step S102, whereas if a negative determination is made in step S401, the execution of this flow or routine is terminated.

Then, in the control flow or routine shown in FIG. 14, after the processing of step S103, it is determined in step S402 whether a convergence determination flag nflag read in step S103 is 1. In cases where an affirmative determination is made in step S402, this is a case where it is estimated that the change of the air fuel ratio of the exhaust gas with the execution of the fuel cut processing has converged, and in this case, the routine of the ECU 20 goes to the processing of step S111. On the other hand, in cases where a negative determination is made in step S402, this is a case where it is estimated that the change of the air fuel ratio of the exhaust gas with the execution of the fuel cut processing has not yet converged, and in this case, the execution of this flow or routine is ended.

In addition, in the control flow or routine shown in FIG. 14, after the processing of step S116, it is determined in step S403 whether an absolute value of a diagnostic output value Crtdg becomes equal to or more than a lean side determination threshold value Clnth. This lean side determination threshold value Clnth is a threshold value for determining whether an abnormality has occurred in the output of the air fuel ratio sensor, and when the absolute value of the diagnostic output value Crtdg becomes equal to or more than the lean side determination threshold value Clnth, the output of the air fuel ratio sensor shifts to the lean side, whereby a determination can be made that an abnormality has occurred in the output of the air fuel ratio sensor. Then, if an affirmative determination is made in step S403, the routine of the ECU 20 goes to the processing of step S404, whereas if a negative determination is made in step S403, the routine of the ECU 20 goes to the processing of step S405.

If an affirmative determination is made in step S403, then in step S404, the output of the air fuel ratio sensor shifts to the lean side, whereby a determination is made that an abnormality has occurred in the output of the air fuel ratio sensor (lean side abnormal determination). On the other hand, if a negative determination is made in step S403, then in step S405, it is determined whether the absolute value of the diagnostic output value Crtdg becomes equal to or less than a rich side determination threshold value Crcth. This rich side determination threshold value Crcth is a threshold value for determining whether an abnormality has occurred in the output of the air fuel ratio sensor, and when the absolute value of the diagnostic output value Crtdg becomes equal to or less than the rich side determination threshold value Crcth, the output of the air fuel ratio sensor shifts to the rich side, whereby a determination can be made that an abnormality has occurred in the output of the air fuel ratio sensor. Then, if an affirmative determination is made in step S405, the routine of the ECU 20 goes to the processing of step S406, whereas if a negative determination is made in step S405, the routine of the ECU 20 goes to the processing of step S407.

If an affirmative determination is made in step S405, then in step S406, the output of the air fuel ratio sensor shifts to the rich side, whereby a determination is made that an abnormality has occurred in the output of the air fuel ratio sensor (rich side abnormal determination). On the other hand, if a negative determination is made in step S405, then in step S407, a determination is made that the output of the air fuel ratio sensor is normal (normal determination). Then, in step S408 after the processing of step S404, S406 or S407, the first output value. Crt1 and the measurement counter Num are initialized. These are initialized as described in the above-mentioned explanation of FIG. 7. In addition, in cases where a negative determination is made in step S102, then in step S409, similarly, the first output value Crt1 and the measurement counter Num are initialized. Then, after the processing of step S408, or after the processing of step S409, the execution of this flow is ended.

As shown in the flow described above, by setting the diagnostic output value Crtdg to the first output value Crt1, the diagnostic output value Crtdg becomes relatively close to the above-mentioned reference output value, even when the fuel supply processing is carried out in the measurement period. Then, the ECU 20 carries out the control flow as mentioned above, whereby it is possible to diagnose the output abnormality of the air fuel ratio sensor with high accuracy while maintaining the function of the exhaust system of the internal combustion engine 1.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A diagnostic apparatus for an exhaust gas sensor, which is applied to an internal combustion engine including:
   at least one exhaust gas sensor that is arranged in an exhaust passage of the internal combustion engine, and outputs an output signal corresponding to an oxygen concentration of exhaust gas;
   a fuel supplier that supplies fuel into said exhaust passage at a location upstream of said at least one exhaust gas sensor, wherein the location is downstream of a cylinder of the internal combustion engine; and
   a controller comprising at least one processor configured to:
   carry out predetermined fuel supply processing in which fuel is repeatedly supplied from said fuel supplier at a predetermined period; and
   carry out predetermined oxygen concentration processing which is different from said predetermined fuel supply processing, and in which the oxygen concentration of the exhaust gas is raised to a predetermined oxygen concentration, and in which a state where the oxygen concentration of the exhaust gas becomes said predetermined oxygen concentration is formed for a predetermined period of time or more;
   wherein a diagnosis of said at least one exhaust gas sensor is carried out based on an output value of said at least one exhaust gas sensor;
   said controller is further configured to diagnose said at least one exhaust gas sensor in such a manner that when said predetermined fuel supply processing is carried out in a measurement period which is a period of time from a predetermined reference timing after a timing at which the rise of the oxygen concentration of the exhaust gas accompanying the execution of said predetermined oxygen concentration processing converges until said predetermined period of time elapses, the controller sets as a diagnostic output value a first output value, which is an output value at the side of the highest oxygen concentration in the output value of said at least one exhaust gas sensor in said measurement period, and performs the diagnosis of said at least one exhaust gas sensor based on the diagnostic output value.

2. The diagnostic apparatus for an exhaust gas sensor according to claim 1, wherein
   when said predetermined fuel supply processing is not carried out in said measurement period, said controller diagnoses said at least one exhaust gas sensor by using as said diagnostic output value a second output value which is a mean value of the output value of said at least one exhaust gas sensor in said measurement period.

3. The diagnostic apparatus for an exhaust gas sensor according to claim 2, wherein
   if in said measurement period, there exist a time period in which said predetermined fuel supply processing is carried out, and a time period in which said predetermined fuel supply processing is not carried out, said controller diagnoses said at least one exhaust gas sensor, by using as said diagnostic output value an output value at the higher oxygen concentration, of a third output value which is an output value at the side of the highest oxygen concentration in the output value of said at least one exhaust gas sensor at the time when said predetermined fuel supply processing is carried out in said measurement period, and a fourth output value which is a mean value of the output value of said at least one exhaust gas sensor at the time when said predetermined fuel supply processing is not carried out in said measurement period.

4. The diagnostic apparatus for an exhaust gas sensor according to claim 3, wherein
   said controller is further configured to:
   calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
   estimate the response of said at least one exhaust gas sensor based on said response index value.

5. The diagnostic apparatus for an exhaust gas sensor according to claim 3, wherein
   said controller is further configured to:
   calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
   diagnose the abnormality of the response of said at least one exhaust gas sensor based on said response index value.

6. The diagnostic apparatus for an exhaust gas sensor according to claim 2, wherein if in said measurement period, there exist a time period in which said predetermined fuel supply processing is carried out, and a time period in which said predetermined fuel supply processing is not carried out, said controller sets as said diagnostic output value a fourth output value which is a mean value of the output value of said at least one exhaust gas sensor at the time when said predetermined fuel supply processing is not carried out in said measurement period, and diagnoses said at least one exhaust gas sensor based on said diagnostic output value and a length of the time period in which said predetermined fuel supply processing is not carried out in said measurement period.

7. The diagnostic apparatus for an exhaust gas sensor according to claim 6, wherein
said controller is further configured to:
calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
estimate the response of said at least one exhaust gas sensor based on said response index value and the length of the time period in which said predetermined fuel supply processing is not carried out in said measurement period.

8. The diagnostic apparatus for an exhaust gas sensor according to claim 6, wherein
said controller is further configured to:
calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
diagnose the abnormality of the response of said at least one exhaust gas sensor based on said response index value and the length of the time period in which said predetermined fuel supply processing is not carried out in said measurement period.

9. The diagnostic apparatus for an exhaust gas sensor according to claim 2, wherein
said controller is further configured to:
calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
estimate the response of said at least one exhaust gas sensor based on said response index value.

10. The diagnostic apparatus for an exhaust gas sensor according to claim 2, wherein
said controller is further configured to:
calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
diagnose the abnormality of the response of said at least one exhaust gas sensor based on said response index value.

11. The diagnostic apparatus for an exhaust gas sensor according to claim 1, wherein
if in said measurement period, there exist a time period in which said predetermined fuel supply processing is carried out, and a time period in which said predetermined fuel supply processing is not carried out, said controller diagnoses said at least one exhaust gas sensor, by using as said diagnostic output value an output value at the higher oxygen concentration, of a third output value which is an output value at the side of the highest oxygen concentration in the output value of said at least one exhaust gas sensor at the time when said predetermined fuel supply processing is carried out in said measurement period, and a fourth output value which is a mean value of the output value of said at least one exhaust gas sensor at the time when said predetermined fuel supply processing is not carried out in said measurement period.

12. The diagnostic apparatus for an exhaust gas sensor according to claim 11, wherein
said controller is further configured to:
calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and
estimate the response of said at least one exhaust gas sensor based on said response index value.

13. The diagnostic apparatus for an exhaust gas sensor according to claim 11, wherein
said controller is further configured to:
calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and diagnose the abnormality of the response of said at least one exhaust gas sensor based on said response index value.

14. The diagnostic apparatus for an exhaust gas sensor according to claim 1, wherein if in said measurement period, there exist a time period in which said predetermined fuel supply processing is carried out, and a time period in which said predetermined fuel supply processing is not carried out, said controller sets as said diagnostic output value a fourth output value which is a mean value of the output value of said at least one exhaust gas sensor at the time when said predetermined fuel supply processing is not carried out in said measurement period, and diagnoses said at least one exhaust gas sensor based on said diagnostic output value and a length of the time period in which said predetermined fuel supply processing is not carried out in said measurement period.

15. The diagnostic apparatus for an exhaust gas sensor according to claim 14, wherein said controller is further configured to:

calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and estimate the response of said at least one exhaust gas sensor based on said response index value and the length of the time period in which said predetermined fuel supply processing is not carried out in said measurement period.

16. The diagnostic apparatus for an exhaust gas sensor according to claim 14, wherein said controller is further configured to:

calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and diagnose the abnormality of the response of said at least one exhaust gas sensor based on said response index value and the length of the time period in which said predetermined fuel supply processing is not carried out in said measurement period.

17. The diagnostic apparatus for an exhaust gas sensor according to claim 1, wherein said controller is further configured to:

calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and estimate the response of said at least one exhaust gas sensor based on said response index value.

18. The diagnostic apparatus for an exhaust gas sensor according to claim 1, wherein said controller is further configured to:

calculate a response index value having a correlation with the response of said at least one exhaust gas sensor, by dividing a maximum value of an absolute rate of change, which is an absolute value of a rate of change of the output value of said at least one exhaust gas sensor in a period of time from the start of execution of said predetermined oxygen concentration processing to said predetermined reference timing, by a difference between the output value of said at least one exhaust gas sensor at the time when said absolute rate of change becomes the maximum value and said diagnostic output value; and diagnose the abnormality of the response of said at least one exhaust gas sensor based on said response index value.

19. The diagnostic apparatus for an exhaust gas sensor according to claim 1, wherein when there is a predetermined diagnosis execution request with respect to said at least one exhaust gas sensor and said predetermined oxygen concentration processing is carried out, the diagnosis of said at least one exhaust gas sensor by said controller is carried out;

when an execution condition for said predetermined fuel supply processing is satisfied and there is no said predetermined diagnosis execution request with respect to said at least one exhaust gas sensor, said controller carries out said predetermined fuel supply processing by setting an amount of supply of fuel to be supplied at one time to a first predetermined amount and by supplying fuel in a repeated manner at a first predetermined period; and when the execution condition for said predetermined fuel supply processing is satisfied and there is said predetermined diagnosis execution request with respect to said at least one exhaust gas sensor, and when said predetermined oxygen concentration processing is carried out, said controller carries out said predetermined fuel supply processing by setting an amount of supply of fuel to be supplied at one time to a second predetermined amount smaller than said first predetermined amount and by supplying fuel in a repeated manner at a second predetermined period longer than said first predetermined period.

20. The diagnostic apparatus for an exhaust gas sensor according to claim 19, wherein
- said internal combustion engine is further provided with an exhaust gas purification catalyst group that is arranged in said exhaust passage;
- said exhaust gas purification catalyst group is composed of a plurality of exhaust gas purification catalysts including a first exhaust gas purification catalyst in which a catalyst having an oxidation function is supported, and a second exhaust gas purification catalyst arranged in said exhaust passage at the downstream side of said first exhaust gas purification catalyst;
- said fuel supplier supplies fuel to said exhaust passage at the upstream side of said first exhaust gas purification catalyst;
- said at least one exhaust gas sensor is composed of a plurality of exhaust gas sensors including a first exhaust gas sensor arranged in said exhaust passage between said first exhaust gas purification catalyst and said second exhaust gas purification catalyst, and a second exhaust gas sensor arranged in said exhaust passage at the downstream side of said second exhaust gas purification catalyst;
- when the execution condition for said predetermined fuel supply processing is satisfied and there is said predetermined diagnosis execution request with respect to said first exhaust gas sensor among said plurality of exhaust gas sensors, and when said predetermined oxygen concentration processing is carried out, said controller carries out said predetermined fuel supply processing by setting the amount of supply of fuel to be supplied at one time to said second predetermined amount and by supplying fuel in a repeated manner at said second predetermined period; and
- when the execution condition for said predetermined fuel supply processing is satisfied and there is said predetermined diagnosis execution request with respect to said second exhaust gas sensor among said plurality of exhaust gas sensors, and when said predetermined oxygen concentration processing is carried out, said controller carries out said predetermined fuel supply processing by setting the amount of supply of fuel to be supplied at one time to said first predetermined amount and by supplying fuel in a repeated manner at said first predetermined period.

* * * * *